(12) United States Patent
Dhurandhar et al.

(10) Patent No.: US 7,395,235 B2
(45) Date of Patent: Jul. 1, 2008

(54) STRATEGY INDEPENDENT OPTIMIZATION OF MULTI OBJECTIVE FUNCTIONS

(75) Inventors: Medha Dhurandhar, Pune (IN); Koustubh Pawar, Pune (IN)

(73) Assignee: Centre for Development of Advanced Computing, Pune (IN)

( * ) Notice: Subject to any disclaimer, the term of this patent is extended or adjusted under 35 U.S.C. 154(b) by 1130 days.

(21) Appl. No.: 10/196,960

(22) Filed: Jul. 17, 2002

(65) Prior Publication Data
US 2003/0233304 A1      Dec. 18, 2003

(30) Foreign Application Priority Data
Jun. 13, 2002    (IN) .............. 523/MUM/2002

(51) Int. Cl.
   *G06Q 40/00*    (2006.01)
(52) U.S. Cl. .............. 705/36; 705/26; 706/16
(58) Field of Classification Search .......... 705/36
   See application file for complete search history.

(56) References Cited

U.S. PATENT DOCUMENTS 5,822,741 A * 10/1998 Fischthal .............. 706/16

2001/0034663 A1 * 10/2001 Teveler et al. .............. 705/26
2002/0091605 A1 * 7/2002 Labe et al. .............. 705/36

OTHER PUBLICATIONS http://web.archive.org/web/19991013233738/wardsystem.com/genehunt4.htm and http://web.archive.org/web/20000526233039/wardsystems.com/genehunt2.htm.*
http://web.archive.org/web/20010421012708/neuroshell.com/products.asp?task=features&id=8, http://web.archive.org/web/20010423060159/neuroshell.com/products.asp?task=examples&id=7 and http://web.archive.org/web/20010428164113/neuroshell.com/products.asp?task=features&id=11.*
Kassicieh et al., "Investment decisions using genetic algorithms", Jan. 7-10, 1997, System Science, 1997, Proceedings of the Thirtieth Hwaii International Conference on, pp. 484-490 vol. 5.*

* cited by examiner

*Primary Examiner*—Harish T. Dass
*Assistant Examiner*—Shahid R Merchant
(74) *Attorney, Agent, or Firm*—Charles A. Muserlian

(57) ABSTRACT

A method for strategy independent optimization of a multi-objective function of a portfolio containing at least one investment is disclosed. The method involves the use of genetic algorithms to arrive at function optimization. A suite of strategies is provided enabling the user to select a strategy and optimize a function. Real world data is drawn from exchanges and is utilized for replication. The invention also discloses a novel combination of apparatus for carrying out the method of invention, typically, using parallel processing.

22 Claims, 9 Drawing Sheets

| Date | Time Stamp | Ticker | Price | Volume |
|---|---|---|---|---|
| 2-Jan-95 | 131628 | CastrolIndia | 871.0000 | 100 |
| 2-Jan-95 | 135910 | CastrolIndia | 872.0000 | 50 |
| 2-Jan-95 | 140015 | CastrolIndia | 873.0000 | 50 |
| 3-Jan-95 | 110259 | CastrolIndia | 870.0000 | 100 |
| 3-Jan-95 | 122746 | CastrolIndia | 867.0000 | 50 |
| 3-Jan-95 | 125710 | CastrolIndia | 867.0000 | 50 |
| 3-Jan-95 | 125819 | CastrolIndia | 865.0000 | 50 |
| 3-Jan-95 | 135924 | CastrolIndia | 867.0000 | 450 |
| 3-Jan-95 | 142603 | CastrolIndia | 870.0000 | 1400 |
| 3-Jan-95 | 142721 | CastrolIndia | 869.0000 | 50 |
| 3-Jan-95 | 143252 | CastrolIndia | 870.0000 | 50 |
| 3-Jan-95 | 144544 | CastrolIndia | 869.0000 | 50 |
| 3-Jan-95 | 145034 | CastrolIndia | 870.0000 | 150 |
| 3-Jan-95 | 145034 | CastrolIndia | 870.0000 | 100 |
| 4-Jan-95 | 130647 | CastrolIndia | 872.0000 | 150 |
| 4-Jan-95 | 132648 | CastrolIndia | 875.0000 | 50 |
| 4-Jan-95 | 142309 | CastrolIndia | 872.5000 | 100 |
| 4-Jan-95 | 142556 | CastrolIndia | 870.0000 | 50 |
|  |  |  |  |  |
| 2-Jan-95 | 130745 | GlaxoIndia | 505.0000 | 50 |
| 2-Jan-95 | 132523 | GlaxoIndia | 501.0000 | 50 |
| 2-Jan-95 | 135042 | GlaxoIndia | 500.0000 | 50 |
| 2-Jan-95 | 142604 | GlaxoIndia | 502.0000 | 100 |
| 2-Jan-95 | 143924 | GlaxoIndia | 507.0000 | 100 |
| 3-Jan-95 | 120913 | GlaxoIndia | 507.0000 | 50 |
| 3-Jan-95 | 122524 | GlaxoIndia | 500.0000 | 50 |
| 3-Jan-95 | 122908 | GlaxoIndia | 500.0000 | 50 |
| 3-Jan-95 | 125614 | GlaxoIndia | 506.0000 | 50 |
| 3-Jan-95 | 125640 | GlaxoIndia | 505.0000 | 100 |
| 3-Jan-95 | 134143 | GlaxoIndia | 498.0000 | 200 |
| 3-Jan-95 | 134202 | GlaxoIndia | 497.0000 | 50 |
| 3-Jan-95 | 152810 | GlaxoIndia | 505.0000 | 50 |
| 3-Jan-95 | 152810 | GlaxoIndia | 505.0000 | 50 |
| 4-Jan-95 | 131753 | GlaxoIndia | 260.0000 | 50 |
| 4-Jan-95 | 131753 | GlaxoIndia | 260.0000 | 50 |
| 4-Jan-95 | 134609 | GlaxoIndia | 256.0000 | 50 |
| 4-Jan-95 | 135334 | GlaxoIndia | 256.0000 | 50 |
| 4-Jan-95 | 135334 | GlaxoIndia | 255.0000 | 100 |

FIGURE - 5

| Symbol | Date&Time | High(H) | Low(L) | (H+L)/2 | Discrete Time Interval |
|---|---|---|---|---|---|
| Glaxo | 02-Jan-95 | 507.0000 | 500.0000 | 503.5000 | Daily |
| Glaxo | 03-Jan-95 | 507.0000 | 497.0000 | 502.0000 | Daily |
| Glaxo | 04-Jan-95 | 260.0000 | 255.0000 | 257.5000 | Daily |
| Castrol | 02-Jan-95 14:00 | 872.0000 | 871.0000 | 871.5000 | Hourly |
| Castrol | 02-Jan-95 15:00 | 873.0000 | 873.0000 | 873.0000 | Hourly |
| Castrol | 03-Jan-95 12:00 | 870.0000 | 870.0000 | 870.0000 | Hourly |
| Castrol | 03-Jan-95 13:00 | 867.0000 | 865.0000 | 866.0000 | Hourly |
| Castrol | 03-Jan-95 14:00 | 867.0000 | 867.0000 | 867.0000 | Hourly |
| Castrol | 03-Jan-95 15:00 | 870.0000 | 869.0000 | 869.5000 | Hourly |
| Castrol | 04-Jan-95 14:00 | 875.0000 | 872.0000 | 873.5000 | Hourly |
| Castrol | 04-Jan-95 15:00 | 872.5000 | 870.0000 | 871.2500 | Hourly |

FIGURE - 6

STRATEGY INDEPENDENT OPTIMIZATION OF MULTI OBJECTIVE FUNCTIONS

FIELD OF THE INVENTION

This invention relates to a method and apparatus for optimization of a multi-objective function of a portfolio containing at least one investment.

Particularly, this invention relates to a strategy independent method and apparatus for optimization of a multi-objective function on a portfolio containing at least one investment.

DESCRIPTION OF THE PRIOR ART

Financial contracts are as old as written language—in fact, writing appears to have been invented for the purposes of recording financial deals. The first archaeological traces of financial activity appear in the earliest urban civilizations in the Near East. Where did the idea of borrowing and lending come from? How did the idea of interest payments evolve? Who first realized that "time is money?" The answers to at least some of these questions lie buried in ruins of Uruk, and her ancient sister-cities of Mesopotamia.

The most important lesson learned from the emergence of finance in ancient Mesopotamia and Greece is that financial instruments from their very inception could be tools for both enterprise and control. At its worst finance became an institutional tool, used by the government, to extract taxes and rents from its citizenry, and a way for a group of entrepreneurs to exploit the working class mired in debt. It was seen that, at times, the techniques of finance could be turned on the government itself.

Individuals, who had a plan or vision for the future, could use financial contracts to profit from that plan. Borrowing multiplied the temporary financial power of the individual, and allowed him or her great feats of economic strength. This strength at times challenged the power of the state itself, the power of human compassion, and even the power of moral reason.

"Finance is not like other technologies". It is not something that, once discovered, becomes a permanent cultural fixture. From the very beginning, governments saw it as both good and evil, and alternately supported and suppressed it. Finance may thrive on stability, but it is threatened by situations in flux. Throughout human history, financial instruments have frequently been re-invented as a way to solve certain human problems.

In the centuries since the era of the Mesopotamian and Greek financiers, the financial world has become increasingly complex, but the fundamental principles and tools they discovered several millennia ago have remained the root of all investment contracts. In all likelihood, we must thank an ancient Uruk accountant for the discovery of the time value of money—and we must also not forget to thank the generations of financiers that followed in his wake for the ingenious means to exploit it.

Studies have identified the five essential components for a financial system:

strong public (or governmental) finance—raising revenues, controlling expenditures, and servicing public debts.

stable money, one that serves as useful medium of exchange and a trusted store of value. That includes having the state either define a relatively stable monetary base, as in the case of metallic-based monetary standards such as the gold standard, or creating a stable base in the case of fiat monetary systems such as we have today.

a banking system that accepts deposits of money and creates, through lending to creditworthy borrowers, a reliable bank money convertible into the stable monetary base.

a central bank that serves as the government's bank, as a regulator and supervisor of a country's financial system, and as an executor of monetary and financial policies promoting economic stability and growth.

The final key component of a modern financial system is a securities market that finances governments and business enterprises by facilitating the issue of new securities (bonds, equity shares, and other financial instruments) and gives such securities "liquidity" by providing trading markets for securities after they are issued.

The capital market is a market for a long-term finance-debt and equity. The capital market before 1600 differed from that of today both in the issuers and in the instruments and organization. In terms of instruments and organization, while the capital market faced the same basic problems as it does today—how to reduce the risk of the debt, how to ensure equity-holders a return on their investment—differences in the legal environment and in technology led to very different results.

Academic finance theory uses some of the most powerful analytical tools available in social science to model the operation of such markets, usually on the basis of strong assumptions about the rationality of actors and the availability of information. There are also practitioner theories, which often put less emphasis on rationality; books by and about traders describe trading strategies that may generate large rewards.

Trading in financial markets sustains heroes and myths; it sustains movies and television shows. People who trade in financial markets are generally aware of both sets of theories. They are trained to understand the academic theories of the market, but also immersed in the folklore of the practitioner theorists. These two sets provide, by the nature of the markets they govern, two rather different things.

The first is a theory of how the world of financial markets works.

The second is a theory or set of theories which act as guidelines for successful action within markets—theories about how to work the world.

Financial markets are not perfect and traders do not have perfect information. Moreover, their actions keep things that way. Imperfections are essential to making money but are intrinsically unknowable to the majority of traders at any time.

The markets are in fact a complicated mixture of formal, publicly available knowledge and knowledge which is tacit in one of two senses.

It may be necessarily tacit, based in intuition about market change. This knowledge is typically generated in learning-focused noise trading which results in experientially grounded "feelings" about the market, which provide a basis for risk exposure. It may be conceptualized as a deeply embedded heuristic which traders describe as flair, the precise content of which cannot easily be articulated.

It may be contingently tacit—kept so for profit by the originating trader or traders in order to be locally rather than generally appropriable.

Markets, are in information terms, highly decentralized. Relevant knowledge "Never exists in concentrated or integrated form, but solely as the dispersed bits of incomplete and frequently contradictory knowledge which all separate individuals possess"

Modern financial markets are very complex and many socio-economic, political, business and international events have major impact on the market movement of financial instruments. Also modern globalization policies create an eruption of information and communication technologies have thinned down boundary barriers amongst various countries.

In view of all this financial markets have become more and more uncertain and perhaps unstable. Trading system which were found robust over a period of time have lost their impetus to yield desirable results. Thus the mathematical models used for building these trading systems need some revamping and adjustment to adapt to the volatile market situations.

Universe of the financial instruments available for investment is very vast. Also trading rules that work well for one investment during some time frame may not prove profitable for the same instrument during some other time frame or for some other investment during the same time frame.

For ensuring optimal results over different time frames for portfolios of several instruments, one needs to dynamically build trading systems using financial indicators with optimum result yielding indicator parameters.

There are many styles and approaches to investing.

Before the existence of computers, computer based analytique tools, investors used to go by their "Sixth sense" to decide where to invest their hard-earned money. But most of the times their investment decisions were "Shot in the Dark" which had little chance of succeeding.

The effort and time spent on doing manual calculations and analysis for hours or even days on huge volumes of data to arrive at a single investment decision, left potential investors not only exhausted and frustrated with delayed or inaccurate decisions but not much closer to their financial goals chiefly due to the unpredictability of market movements.

Today there exists a complex of institutional mechanisms to address the problem of—extensive reporting and analysis of financial information. Since none of these existed before, trading analysis was according to an individual's perception.

Market survey reveals that few of the leading investors spend little time with quantitative models when making investment decisions and hence the field of investment can be approached in a very technical way with heavy reliance on computers instead of the common sense or low-tech approach.

There are different schools of thoughts for optimal investment management. Some lay more emphasis on fundamental analysis whereas others focus more on technical analysis. Quantitative analysis, efficient market hypotheses are yet other techniques adopted for investment management.

Currently some computer-based tools are available for portfolio management. The power and utility of these results are constrained either by configuration of the computer systems which limit the data size analyzed and also speed of analysis or by analytiques which are not comprehensive enough to perform well in most of the market scenarios.

Techniques such as exhaustive search works well, when the search space is small. However for complex optimization problems such as optimal trading strategies for portfolio of investments, the search space explodes in size and hence even parallel processing on fastest of computers becomes very costly and infeasible. Technique like simulated annealing is very slow and hence requires huge amount of time to arrive at a reasonably good result. Quality of the result obtained from the Monte Carlo method heavily depends on the quality of random numbers, which if turned out to be pseudo in nature can produce a sub-standard result.

OBJECTS OF THE INVENTION

This invention seeks to alleviate this situation, by envisaging a system for optimizing returns using genetic algorithm based techniques and a synergistic combination of devices while trading in the Capital Market.

A principal object of this invention is to provide a method and apparatus for scientifically improving the odds of winning in a complex, uncertain world.

Another object of this invention is to provide a suite of analytiques addressing problems in the Capital Market area. This is achieved by providing to the user a plurality of inbuilt resident strategies and allowing the user to select one or more of the strategies for the purpose of optimization.

Still another object of this invention is to provide a method and apparatus which addresses the heterogeneous needs of various user categories like investors, credit rating agencies regulatory bodies, funds and investment managers, brokerage houses and research and consultancy organizations.

Yet another object of this invention is to integrate human expert analysis with human-independent market analysis.

Another object of this invention is to enable end-users with varied appetite for risk to develop money making trading systems.

One embodiment of this invention also assists in timely detection of market irregularities.

Built into the system is the innovative concept of data mining in accordance with this invention, which enables the user to extract and act upon only the useful information from the enormous amount of data available.

Also keeping in view sensitivity of different industries to market movements and reaction of the market to macroeconomic variables, the method and apparatus envisaged in accordance with this invention performs in-depth analysis for each of several investment components to elicit robust strategies for each of these for different time frames.

Still particularly, this invention relates to a strategy independent method and apparatus for optimization of a multi-objective function on a portfolio containing at least one investment using the principles of genetic algorithms.

The genetic algorithm model based techniques envisaged in accordance with this invention can be used in the method and on the apparatus of this invention to meet the requirement of optimization. By using efficient algorithms and using a parallel processing paradigm it is possible in accordance with this invention to quickly achieve optimal results in a vast search space, where other techniques and apparatus therefor available today will either take a much longer time to arrive at these decisions thereby, increasing cost of investment and perhaps missing profitable opportunities in the fast moving markets or yield a sub-optimal result inferior to the results achieved by this invention. There certainly is a trade-off between the quality of result and the time spent on analysis. The method and apparatus in accordance with this invention balances both these. Therefore this invention envisages a cost-effective method for, typically, returns maximization and risk minimization.

The method and apparatus envisaged in accordance with this invention alleviates many of the drawbacks of prior art methods, which have been popularly used for trading strategy optimization in financial markets. The method in accordance with this invention is fast enough to scan through very large search spaces in considerably less amount of time, is flexible enough to adapt to various methods of ranking selection and fitness functions of the genetic algorithm model and can be made parallel enough to exploit parallelism not only from the multi-CPU architecture of a single node but multi-node clustering environment consisting of nodes with multiple CPUs.

A genetic algorithm is a method simulating the mechanisms of inheritance and evolution of living things. In the evolution of living things, genomic changes like crossovers of chromosomes, mutations of genes, and the like may occur when new off springs are born from parents. An off spring, which cannot adapt to the environment fails to survive after natural selection on the other hand an adaptable one survives and becomes a parent of a new descendant. Such adaptability is determined by their genomic properties.

In a genetic algorithm, a candidate of a result to an optimization problem is represented as a character string (corresponding to a chromosome which is a one-dimensional string of genes), and a result is searched by repeating genetic operations including selection, crossover, mutation, and the like.

Here, evolution of living things corresponds to a method in which a value of the objective function (which is the function evaluated to determine the suitability for the optimization problem) of each character string approaches an optimum value. The selection operation is performed by choosing parent strings with a high evaluation value. In a mutation operation, some characters are replaced with other characters at random. The objective is to search the solution space more thoroughly to get out of a local maximum. In the crossover operation, substrings of a pair of strings are exchanged with the view of generating an offspring inheriting better qualities of both the parents. By repeating these operations, we can obtain a new generation that is fitter than its parent generation.

In the conventional genetic algorithm, mutation is performed uniformly in the whole of the string, i.e. over all positions in the string. However in many optimization problems, there are some positions that need not be mutated. For such problems, conventional uniform mutation is not efficient. Hence for large-scale problem, conventional methods prove very costly.

Furthermore, since a sufficiently large number of generations are required to obtain an adequate string by the conventional genetic algorithm, the search process is continued up to the designated generation, even if a result has been obtained. Conventional methods sometimes also have a problem of efficiency of calculation.

The genetic algorithm technique is a method suitable for optimization for finding the best result to a problem of the kind that has a number of possible results. This technique is suited for complex functions, where the problems are not susceptible to result by conventional mathematical approaches.

For instance in function optimization problems, the objective is to find the best result, i.e., a multivariate result yielding either the minimum or maximum value of a function.

In homotopy methods, function optimization problems are solved using iterative techniques that begin with some intermediate result and move (based on information about the slope or derivative of the function in the locality of that intermediate result) through a succession of subsequent intermediate results such that the evaluation at each intermediate result is smaller (in the case of function minimization) than the previous result. Thus, at ach iteration, the local homotopy methods impose a constraint on the maximum value of the function that may be considered in the next step. These are called greedy methods that are likely to compromise on quality for finding a quick solution.

In these so-called local homotopy methods, the iterative process can only move in one direction typically "downhill" (i.e., continually seek smaller values of the function), so that when the process reaches a minimum value, it is likely to be only a local minimum and thus not the desired global optimum. In an attempt to avoid becoming "stuck" in a local optimum, the homotopy method may be repeated at many different and randomly chosen starting intermediate results. The trajectories (sequences of intermediate results) produced by the homotopy method in the localities of these initial results are followed downhill until local optima are found; the best of these local optima is chosen as the estimate of the global optimum. To be confident that these local homotopy methods have discovered the global result, the search space must be carefully sampled which typically requires a great number of initial trials.

Global homotopy methods have also been developed that permit the iterative result to proceed "uphill" at times in an attempt to avoid getting stuck at a local maximum. In this way, some types of local optima: may be avoided, but there is no guarantee that the global result will necessarily be found. Consequently, it is well-known that global homotopy methods, like local ones, require a large number of initial trials to assure that the global result will be found.

Thus, while homotopy methods are especially effective at reaching the optimum result quickly if they begin at an intermediate result that is near to the optimum, most homotopy methods are subject to failure if they begin outside the "basin of attraction" (the region in which downhill motion will lead to a local optimum) of the optimum result. And, of course, homotopy methods require derivative information and thus cannot solve problems for which "uphill" and "downhill" directions have no meaning. This lack of derivative information is typical of combinatorial optimization problems.

Another category of problem solving techniques, applicable both to combinatorial and function optimization problems, is the Standard Genetic Algorithm Optimizer (SGAO). SGAOs solve problems by providing a representation for the possible intermediate results and then proceeding through successive iterations to reach an optimal result.

In a SGAO, a population of so-called chromosomes represents the parameters of the function being optimized. Each chromosome may be, for example, a string of bits (0s and 1s in the memory of a computer) with all chromosomes in the population having the same number of bits. In the case of multiple parameters, a chromosome then becomes a string of genes, where each gene is a string of bits representing one of the parameters. All of the parameters are thereby represented as genes of bit strings along the chromosome. In other words, the structure of the chromosome is unchanged (it is still a string of bits) but its bits are divided into genes representing the various parameters of the problem. This allows the same operators and measurements to be applied to either whole chromosomes or separate genes without significantly altering them.

In each iteration of the process, a SGAO explores the "chromosome space" by manipulating the values of at least some of the chromosomes (unlike the local homotopy methods, which explore the "result space" directly). The ultimate goal is to have all of the chromosomes of the population converge to the same value, at which the function is at a minimum.

There are two principal ways of manipulating the chromosomes during a given iteration (called a generation). One way, mutation, switches the values of bits in each one of a number of randomly selected bits from all chromosomes of the total population of chromosomes. In the other way, crossover, certain chromosomes are selected from the population for mating with other selected chromosomes. Whether a given chromosome is selected for mating depends on the corresponding value of the function being optimized. For example a chromosome of the population may not be chosen for mating because it corresponds to a very high value of the function being optimized, while another would likely be chosen for mating because it has a good value.

A crossover operator that produces the mating results from two selected chromosome parents can be defined as the crossover operator that leads to the extraordinarily quick discovery of early approximate results (typically much faster than other algorithms including homotopy methods, Monte Carlo, and simulated annealing techniques). It is also this operator that is primarily responsible for the very slow late refinement of approximate results.

In one possible example of mating, the crossover has the effect, in early iterations of the process, of propagating to later generations the highest-order bit of the optimum result. In this manner, the crossover operation "finds" the higher-order bits early on and "remembers" them by storing them in the higher-order bit positions of the chromosomes.

This need to "remember" the higher-order bits while continuing to search for the lower-order bit values leads to an inefficient search for those bits and ultimate breakdown of SGAOs treating complex problems.

Newer techniques in genetic algorithm optimization eliminates this need for the chromosomes to "remember" these bit values by simply extracting, when appropriate, this information from the chromosomes, conceptualizing it, and storing it within an adaptable translational mapping. This frees the chromosomes in conjunction with crossover to perform at maximum efficiency during their entire search, alleviating this disadvantage inherent in SGAOs.

A SGAO is more efficient in earlier iterations, when the intermediate result may not be near the optimum result, while homotopy methods are more effective when the intermediate result is close to the optimum, it has been proposed to switch from a SGAO to a homotopy method at some point in the process of solving a problem. This strategy, however, has difficulties because if the switch is made too early, the homotopy method will drive the trajectory of intermediate results to a local optimum, while if the switch is made too late, the increased efficiency of the homotopy method is lost.

The structure of the chromosome space and the translation together make up a representational scheme that is predefined and does not change from generation to generation. The SGAO is thus solely an evolutionary (i.e., Darwinian—random mutation with survival and mating of the fittest) technique in that information is passed only in the direction from the chromosome population to the intermediate result population (and to the genetic algorithm operators as payoffs of individual intermediate results). Although representations of the result are stored in the bits of the chromosome population, the SGAO never alters the representational scheme.

It is well known that the method of representing the intermediate results of the space of all possible results is most important to any particular algorithm's success in searching that space. For complex problems, there is usually no known best representation.

But even beyond not knowing the best representation, it has been proposed that for iterative improvement of algorithms the best representation changes as newer intermediate results are discovered or refined. Whenever the user chooses a representation to employ with a traditional search algorithm, that choice has associated search biases that affect the performance and accuracy of the method and may even lead to its failure.

In the method suggested herein strategy mitigation of many of the detrimental effects of the aforementioned representational issues is obtained by dynamically adapting, in a statistically unbiased fashion, the representation to the specific problem being solved. This frees the user to choose a relatively poor (and typically unknowingly poor initial representation) by a method which will improve upon this choice. Using the method of this invention it is possible to solve optimization problems accurately and efficiently without premature early convergence or slow late convergence, and overcoming flaws in the original representational scheme of the intermediate results.

As a general feature, this invention provides an optimization method for finding the best result to a problem of the kind for which there is a space of possible results as applied in the field of management of a portfolio of investments. In the method, off-springs take on values that represent intermediate results in accordance with a representational scheme that defines the relationships between given offspring values and corresponding intermediate results; by an iterative process, the values of the off-springs are changed to explore the result space and to converge on the best result; and for at least some iterations, characteristics of the value of the off-springs and/or the intermediate results are analyzed and the representational scheme for later iterations is modified based on the analysis for earlier iterations without interrupting the succession of iterations. Preferred embodiments of the invention include the following features. The representational scheme defines characteristics of the off-springs, and the modifying step includes adjusting those characteristics. For example, the off-springs each comprise a string of characters, the representational scheme defines the number of characters in the string (the number corresponds, e.g., to the re result with which the values of the off-springs represent possible results), and at least one operator is invoked for adjusting the number of characters in order to change the result.

In some embodiments, the operator is invoked on the basis of a measurement of convergence of the population of off-springs.

Preferred embodiments can also include the following features. The representational scheme can include an adaptive translation mapping for converting values of off-springs to corresponding intermediate results, and at least one operator can be invoked for changing the adaptive translation mapping.

Preferred embodiments can also further include the following features. The step of analyzing characteristics of the off-springs may include applying various statistical and other mathematical measurements across a population of intermediate results or a population of off-springs or both. For example, the measurements may be the convergence, or similarity, of the off-springs, or the first, second, or fourth moments of the intermediate results. The operators can also include (i) an elitist operator which stores information about the offspring representing a favorable possible result in one iteration, and reimparts the information to a population of off-springs in a later iteration; (ii) other elitist operators that can adjust the adaptive translation mapping to assure that information is not lost from one adaptation procedure to the next; (iii) a homotopy optimizer operator which can adjust intermediate results forming trajectories leading to local optima for each offspring of the population; (iv) a biased sampling operator, such as a metropolis mutation operator, which can weight the random sampling procedure towards better trials; an annealing schedule operator; (v) and split and join operators to split the population of off-springs into subsets and rejoin subsets of the population of off-springs. The convergence measurements can be used to trigger a dither operator, the result operators, a homotopy optimizer operator, and/or an annealing schedule operator. User specified thresholds and factors control the operators, and the user may also apply operators to subportions of the off-springs (e.g., genes of chromosomes) on a subportion by subportion basis.

Another general aspect of the invention provides a method for selectively implementing at least two different problem solving algorithms, each algorithm being of the kind in which one or more intermediate results are represented by one or more off-springs in accordance with a representational scheme, and the desired result is reached by an iterative procedure where in each iteration one or more operators may be applied to change either the offspring or the intermediate results. The method provides a set of available operators, and enables the user to select from the set of available operators a subset of operators for implementing a chosen algorithm.

Preferred embodiments of the invention include the following features. The one or more off-springs sample a space to be searched to reach the desired result, and the method includes enabling the user to define a single consistent space to be searched by at least one genetic algorithm. The user can be enabled to implement a succession of different algorithms using the consistent search space, and the user is provided with comparable information tracking the operation of the different algorithms. The tracked information includes at least one of the following: the relative number of iterations required by different algorithms to reach a result; the results reached; or the sequence of intermediate results traversed. The operators include at least random mutations, homotopies, and crossovers, and the algorithms include at least Monte Carlo, simulated annealing, homotopy, and genetic algorithms. The operators may also include operators that alter the representational scheme based on measurements of the search space and/or the intermediate results.

The method envisaged in accordance with this invention is relatively insensitive to the context of the problem and the representational scheme applied to it or the strategy adopted. Hence the method and apparatus used to carry out the method of this invention is strategy independent and could be applied over a wide spectra of strategies for management of portfolios of investment such as Moving average methods, weighted average strategy, RSI and the like.

Either a binary coding or a Gray coding scheme which can be employed with impunity, for the mapping suggested in accordance with this invention ameliorates their usual disadvantages.

Extremely small search spaces at appropriate generations lead to very fast searches and accurate results. Mutation may be applied as a search strategy as well as an insurance policy to avoid allele loss at a bit position. The technique is relatively insensitive to settings of internal variables and to the initial intermediate results. No a priori information about the result is needed. Premature convergence of the offspring population is avoided. The search for the results is efficient, and the chromosomes are always left fresh to effectively explore the space that they span. The method of this invention is numerically robust; unlike many iterative methods, such as homotopy techniques, round errors at each iteration have almost no effect on the performance or accuracy of the method of this invention. In addition, the divergence problems associated with homotopy methods arising from vanishing derivatives do not occur in the method of this invention. In our experience, the method of this invention is less "greedy" than either simulated annealing or the SGAO—the method algorithm seldom becomes "stuck" at local optima and will even alternate between multiple degenerate global optima or, through the splitting operator, simultaneously pursue multiple global results. Because the method of this invention in effect defines its own vocabulary in which to solve a problem, it also develops its own unique strategy of result for each problem unlike the traditional search methods whose strategies are imposed upon them from the outset.

For instance, when applied to different strategies the method of this invention develops different, and appropriate, methods for searching the respective spaces and also implements an appropriate strategy for switching from an enhanced genetic algorithm to a homotopy method based upon statistical measurements—as previously mentioned, this is a difficult task.

The method of this invention can also implement an automatically adjusted annealing schedule for simulated annealing, again based upon statistical measurements over a population of simultaneously running simulated annealing algorithms.

For complex strategies it is recognized that the annealing schedule is the most difficult task for simulated annealing algorithms.

The framework proposed according to this invention can allow for the qualitative and quantitative comparisons of a number of different algorithms, including a variety of new composite algorithmic approaches, to be performed while searching identical spaces. In addition, it also provides information, including statistical properties, on the progress of the optimization. This information may be employed in the analysis of the quality of the estimated results discovered as well as serve as a basis for the difficult task of developing the halting criteria. New and composite algorithms can be devised and tested. A broad range of real world problems in investment management can be addressed and solved.

Other advantages and features will become apparent from the following description of the preferred embodiment, and from the appended claims.

STATEMENT OF THE INVENTION

According to this invention there is provided a method for strategy independent optimization of a multi-objective function of a portfolio containing at least one investment comprising the steps of:
determining and if required setting the execution mode;
selecting a strategy defined by a set of rules from a set of strategies containing at least one strategy;
identifying a portfolio of investments, consisting of at least one investment, whose multi-objective function has to be optimized;
identifying a set containing a plurality of time series in relation to investment (as herein defined) consisting of at least one time series;
defining the environment including a time frame in which the multi-objective function has to be optimized, a discrete time interval and mode in accordance with standard time;
determining a set of parameters of the selected strategy amenable for optimizing;
creating a genetic algorithm model (as herein defined) which includes its convergence (as herein defined);
creating a sequence of specifications for the determined set of parameters of the selected strategy in the context of the said environment for the said genetic algorithm model for the said portfolio of investments for the said set of time series;
storing the created sequence of specifications in the memory of a first set of processing units containing at least one processing unit;

collating raw data relating to the said portfolio of investments, the said set of time series, and information about the said environment;

polarizing the collated data if required by eliminating noise and storing the polarized data in the memory of a second set of processing units containing at least one processing unit;

fetching the polarized data from its stored location and transposing it for the purpose of iteration using the said strategy in the said environment;

processing the polarized data in accordance with the rules of the said strategy for sets of determined parameters of the said strategy for the said set of time series for the said time frame for the said discrete time interval for the said portfolio of investments in the said environment to generate a sequence of results;

storing the said sequence of results in the memory of a third set of processing units containing at least one processing unit;

generating a set containing a plurality of said sequence of results obtained by varying the sets of determined parameters for the said strategy for the said set of time series for the said time frame for the said discrete time interval for the said portfolio of investments in the said environment;

storing, in the memory of a fourth set of processing units containing at least one processing unit the said set containing a plurality of said sequence of results;

applying the said genetic algorithm model to the created and stored set containing the plurality of said sequences of results to create at least one intermediate generation of optimized multi-objective function of the said portfolio of investments;

determining whether a selected characteristic of the intermediate generation is not satisfied in relation to the said convergence criteria and there after creating a new set of determined parameters;

repeating the steps of the method commencing from generating a set containing a plurality of said sequence of results obtained by utilizing the new set of determined parameters and ending with applying the genetic algorithm model to obtain a new generation of optimized multi-objective function of the said portfolio of investments until the convergence criteria is satisfied to obtain a fully optimized multi-objective function of the said portfolio of investments.

In accordance with a particular embodiment of the invention the execution mode is set in parallel, the default mode being sequential.

Typically, the multi-objective function for a portfolio of investment is return maximization or risk minimization.

Typically, the investments may include one or more combinations of investments, such as, stocks, fixed income securities, derivatives, and currencies. Typically, the process of identifying a portfolio of investments includes the step of creating a portfolio of investments from a universe of investments by selecting at least one investment and the information related there to such as its price and duration as stored in the database of a selected exchange thereby creating a set of durations corresponding to the selected investments in the selected exchange wherein each element in the said set of durations has a start time and an end time.

Further, identifying a portfolio of investments may include the step of selecting a portfolio of investments from a pre-determined stored set of portfolios of investments with or without modifications of an investment in the selected portfolio.

In accordance with a preferred embodiment of the method of this invention, after identifying the portfolio of investments the returns on the said investments of the portfolio positions of the said investments of the portfolio are initialized.

Typically, according to this invention, identifying a set of time series includes the step of creating a set of time series associated with investment information related thereto, such as its price and duration as stored in the database of an selected exchange, along with its other attributes such as discrete time interval and expression (as herein defined) thereby creating a set of durations corresponding to the selected time series in the selected exchange wherein each element in the said set of durations has a start time and an end time.

Further, identifying a set of time series may include the step of selecting a set of time series from a pre-determined stored sets of time series with or without modifications.

Typically, defining the environment may done in terms of the time frame, discrete time interval as will hereinafter be defined and mode in accordance with standard time and defining the environment in terms of the discrete time interval may include the step of obtaining the minimum value of the discrete time interval from the set of discrete time intervals of the said time series. And may also include the step of obtaining the intersection of the said set of duration of time intervals corresponding to the set of time series with the said set of duration of time intervals corresponding to the investments in the portfolio.

Typically, determining the optimization amenable parameters to obtain a set of determined parameters of the selected strategies includes the step of identifying the correlation of the various parameters of the strategy.

In accordance with a preferred embodiment of this invention, creating a genetic algorithm model includes the steps of specifying a method of calculating fitness, specifying a method of ranking, selecting a crossover probability, specifying a method for crossover, selecting a mutation probability, specifying a method for mutation, selecting a convergence criteria and specifying a population size to obtain a genetic algorithm model. Typically, creating the sequence of specifications includes the steps of collating information relating to the said strategy, collating information relating to the said environment, collating information relating to the said portfolio of investments, collating information relating to the said set of time series, collating information relating to the said genetic algorithm model, then sequentially listing as classes and objects, creating linkages between the sequentially listed objects and classes and invoking methods of these sequentially listed objects and classes and the number of processing units to be deployed for execution selected from the said sets of processing units to create the said sequence of specifications.

As typically envisaged in this invention, collating the raw data includes the steps of inputting the raw data from at least one data source, pre-filtering the received data into an intermediately pre-filtered data storage means and linking the elements of the extracted data for the purpose of collation.

The collated data is further typically polarized by filtering spurious records, renaming for organizing, adjusting the time based volume and prices of the elements of the collated data and generating Open-High-Low-Close-Volume bars corresponding to the set of discrete time intervals to obtain polarized data.

Typically, processing of the polarized data for applying the rules of the strategy includes the steps of forming mutually exclusive sets of discrete session timings and includes the steps of selecting the processing units from the said sets of processing units on which the execution is required to take place, iteratively applying rules of the said strategy for the said set of determined parameters; calculating the sequence of results; incrementing time using the said discrete time interval and adjusting for the said mutually exclusive sets of discrete session timings for the entire time frame.

It is a further feature of this invention that creating the set of plurality of sequence of results includes applying at least a part of the genetic algorithm model to the set of determined parameters to create a population of sets of determined parameters and applying the said strategy including its rules to each and every individual of the population of the sets of determined parameters of the processed polarized data.

Typically, storing of the said sequence of results is in a one-to-one mapping with respect to the individuals of the population of the sets of determined parameters.

Typically, applying the genetic algorithm model to the created and stored set containing the plurality of said sequences of results includes the steps of selecting the processing units from the said sets of processing units on which the execution is required to take place, calculating fitness of each and every individual of the population of the sets of determined parameters using selected fitness function; ranking the individuals using the selected method of ranking; creating an offspring population of individuals of the said population size by applying selected crossover method with said crossover probability and selected mutation method with the said mutation probability to create an offspring population of individuals of determined set of parameters and includes iterating the aforesaid steps to obtain generations of offspring and applying the convergence criteria to the number of iterations to verify that desired optimization is achieved.

Further, applying the genetic algorithm model includes the step of applying the convergence criteria to the individuals of the generated offspring to verify that desired optimization is achieved.

Typically, the cardinality of said first, second, third and fourth sets of processing units is the same and the intersection of these said sets has the same cardinality or the cardinality of said first, second and third sets of processing units is the same and the intersection of these said sets has the same cardinality or the cardinality of said first, second and fourth sets of processing units is the same and the intersection of these said sets has the same cardinality or the cardinality of said first, third and fourth sets of processing units is the same and the intersection of these said sets has the same cardinality.

In accordance with an alternative embodiment of the invention, the intersection of the said second, third and fourth sets, or of the said first and second sets, or of the said first and third sets, or of the said first and fourth sets, or of the said second and third sets, or of the said second and fourth sets, of the said third and fourth sets has the same cardinality.

Still alternatively, the intersection of said first, second, third and fourth sets; of the said first, second and third sets; or of said first, second and fourth sets; of said first, third and fourth sets; of the said second, third and fourth sets; or of the said first and second sets; or of the said first and third sets; or of the said first and fourth sets; or of the said second and third sets; or of the said second and fourth sets; of the said third and fourth sets of the processing units; is non-empty.

In accordance with another aspect of this invention there is provided an apparatus for carrying out a method for strategy independent optimization of multi-objective function of a portfolio containing at least one investment consisting of in combination:

at least one processing means for receiving data and instructions and using the instructions to process the data and generate at least one result;

at least one storage means in communication with the said processing means for storing data, instructions, intermediate results, and/or final results in discrete registers and pages adapted to co-operate with each other;

at least one pointing means in communication with the said processing means and the said storage means adapted to inputting data and instructions into the said processing means and the said storage means;

at least one output means for receiving intermediate and final results from the processing means;

at least one interface means enabling the said processing, storage, pointing and output means, to communicate with each other jointly or severally;

at least one set of instructions for utilizing the said processing, storage, pointing, output and interface means to carry out the method;

at least one register or page in the said storage means for storing the instructions relating to the mode of execution of the said processing means;

at least one page in the said storage means for containing a set of strategies containing at least one strategy and their defined rules;

at least one pointing means in conjunction with the said processing means instructed by the said set of instructions adapted to select a strategy from the said set of stored strategies;

at least one database containing information relating to investments;

at least one page in the said storage means for containing a portfolios of investments each of the portfolio containing at least one investment;

at least one pointing means in conjunction with the said processing means instructed by the said set of instructions adapted to select a portfolio from the stored said portfolios of investments for optimizing the multi-objective function;

at least one page in the said storage means for containing a set of time series each of the set containing at least one time series;

at least one pointing means in conjunction with the said processing means instructed by the said set of instructions adapted to select a set of time series from the said stored sets of time series;

at least one instruction in the said set/s of instructions for directing the said processing means to define the environment;

at least one instruction in the said set/s of instructions for directing the processing means to determine the optimization amenable parameters for obtaining a set of determined parameters of the selected strategy;

at least one page in the said storage means for containing a set of means for calculating fitness containing at least one means for calculating fitness, a set of means for ranking containing at least one means for ranking, a set of means for performing crossover containing at least one means for performing crossover and a set of means for performing mutation containing at least one means of performing mutation;

at least one pointing means in conjunction with the said processing means instructed by at least one instruction in the said set/s of instructions adapted to select a means of calculating fitness, a means for ranking, a means for crossover and a means for mutation to create a genetic algorithm model;

at least one instruction in the said set/s of instructions for directing the said processing means to receive the said execution mode, strategy and its determined parameters, portfolio of investments, time series, environment and genetic algorithm model and for processing them to create a sequence of specifications and at least one page in a storage means for storing the created sequence of specifications;

at least one page in the said storage means for containing the raw data relating to the said portfolio of investments, the said set of time series, and the information about the said environment;

at least one instruction in the said set/s of instructions for directing the said processing means to collate, polarize to eliminate noise and store the polarized data in a storage means;

at least one instruction in the said set/s of instructions for directing the said processing means to fetch the stored polarized data;

transposing means cooperating with the processing means for the transposition of the fetched polarized data for the purpose of iteration of the element of the said strategy in the said environment;

at least one instruction in the said set/s of instructions for directing the said processing means to process the polarized data in accordance with the rules of the said strategy for its sets of determined parameters for the said set of time series for the said time frame for the said discrete time interval for the said portfolio of investments in the environment to generate a sequence of results and store sequence of results in a storage means;

at least one instruction in the said set/s of instructions for directing the said processing means to generate a set containing a plurality of said sequence of results obtaining by varying the sets of determined parameters for the said strategy for the said set of time series for the said time frame for the said discrete time interval for the said portfolio of investments in the said environment and store the set containing a plurality of sequence of results in a storage means;

at least one instruction in the said set/s of instructions for directing the said processing means to apply the said genetic algorithm model to the created and stored set containing the plurality of said sequences of results for creating at least one intermediate generation of partly or fully optimized returns on the said portfolio of investments and generating at least one set of determined parameters;

a multiple closed looped feedback means cooperating with the processing means connected to storage means for obtaining partly optimized intermediate values of multi-objective function; at least one setting means for setting of convergence criteria to define an end point for the multiple looping feedback means; and a comparator means for comparing at least one property of feedback obtained from the multiple close looped feedback means with a set defined value of the property as set in co-operation with the said setting means.

Typically, the processing means comprise a plurality of processing units co-operating with each other preferably in parallel mode.

Particularly and in accordance with a practical embodiment of this invention, the plurality of processing units are remotely located and co-operate with each other via interface means.

Typically, the storage means consists of a plurality of linked or remotely located elements co-operating with each other.

Typically, the pointing means consists of at least one from the set of pointing means which includes a keyboard, mouse, digital pens, voice or touch actuated means, joystick, track balls.

Typically, the output means consists of at least one from the set of output means consisting from the set of writing means such as a printer, display means such as a monitor or a video screen, transmission means or storage means.

Typically, the interface means consists of at least one from the set of interface means consisting of direct cabling, local area network and wide area network and advantageously the interface means is the inter-net and the said processing, storage, pointing and output means, communicate with each other jointly or severally via modems.

Typically, the database is a database linked to at least one exchange selected from a set of exchanges consisting of stock exchanges, derivatives exchanges, fixed income exchanges, monetary exchange, the database being static and dynamic.

In accordance with one embodiment of this invention, the processing means which receive the said execution mode, strategy and its determined parameters, portfolio of investments, time series, environment and genetic algorithm model, the processing means which process the said execution mode, strategy and its determined parameters, portfolio of investments, time series, environment and genetic algorithm model and the processing means which create a sequence of specifications, are the same.

In another practical embodiment of this invention, the processing means which receive the said execution mode, strategy and its determined parameters, portfolio of investments, time series, environment and genetic algorithm model, the processing means which process the said execution mode, strategy and its determined parameters, portfolio of investments, time series, environment and genetic algorithm model and the processing means which create a sequence of specifications, consists of a plurality of processing means co-operating with each other.

Typically, at least one of the processing means which receive the said execution mode, strategy and its determined parameters, portfolio of investments, time series, environment and genetic algorithm model, the processing means which process the said execution mode, strategy and its determined parameters, portfolio of investments, time series, environment and genetic algorithm model and the processing means which create a sequence of specifications, is remotely located.

Typically, the collating means consists of inputting means for receiving raw data from at least one data source, pre-filtering means for extracting data into an intermediately pre-filtered data and linking means for linking the elements of the extracted data for the purposes of collation.

Further the polarizing means can include a noise elimination means co-operating with the collating means which consists of filtering means for filtering spurious records, renaming means for organizing, adjustment means for adjusting time based volume and prices of the elements of extracted data, generating means for generating Open-High-Low-Close-Volume bars corresponding to the set of discrete time intervals to obtain polarized data.

In accordance with one aspect of the invention the collating means and the polarizing means are the same or may be remotely located.

Typically, the transposing means is a processing means co-operating with a storage means having a stored set of transposing instructions for processing in accordance with the strategies.

In accordance with one embodiment of this invention the processing means which process the polarized data in accordance with the rules of the said strategy for its sets of determined parameters for the said set of time series for the said time frame for the said discrete time interval for the said portfolio of investments in the environment to generate a sequence of results and the processing means containing the storage means in which the sequence of results is stored, are the same.

Alternatively, the processing means which process the polarized data in accordance with the rules of the said strategy for its sets of determined parameters for the said set of time series for the said time frame for the said discrete time interval for the said portfolio of investments in the environment to generate a sequence of results and the processing means containing the storage means in which the sequence of results is stored, consists of a plurality of processing means co-operating with each other.

Typically, the processing means which process the polarized data in accordance with the rules of the said strategy for its sets of determined parameters for the said set of time series for the said time frame for the said discrete time interval for the said portfolio of investments in the environment to generate a sequence of results and the processing means containing the storage means in which the sequence of results is stored, in which one of the processing means are remotely located.

Further, it is envisaged that the processing means which generate a set containing a plurality of said sequence of results obtaining by varying the sets of determined parameters for the said strategy for the said set of time series for the said time frame for the said discrete time interval for the said portfolio of investments in the said environment and the processing means containing the storage means in which the set containing a plurality of sequence of results is stored, in accordance with one aspect of this invention are the same.

However, in accordance with another aspect of this invention, the processing means which generate a set containing a plurality of said sequence of results obtaining by varying the sets of determined parameters for the said strategy for the said set of time series for the said time frame for the said discrete time interval for the said portfolio of investments in the said environment and the processing means containing the storage means in which the set containing a plurality of sequence of results is stored, consists of a plurality of processing means co-operating with each other.

Again, typically the processing means which generate a set containing a plurality of said sequence of results obtaining by varying the sets of determined parameters for the said strategy for the said set of time series for the said time frame for the said discrete time interval for the said portfolio of investments in the said environment and the processing means containing the storage means in which the set containing a plurality of sequence of results is stored, in which at least one of the processing means may be remotely located.

Again typically, the processing means which create at least one intermediate generation of partly or fully optimized returns on the said portfolio of investments and the processing means which generate at least one set of determined parameters, are the same.

Alternatively, the processing means which create at least one intermediate generation of partly or fully optimized returns on the said portfolio of investments and the processing means which generate at least one set of determined parameters, consists of a plurality of processing means co-operating with each other.

Particularly, the processing means which create at least one intermediate generation of partly or fully optimized returns on the said portfolio of investments and the processing means which generate at least one set of determined parameters, in which at least one of the processing means is remotely located.

Typically, the multiple close loop feedback means is a processing means having a stored set of multiple close loop feedback instructions for obtaining partly optimized intermediate values of multi-objective function.

In accordance with one embodiment of this invention, a storage means is provided to store the set of convergence criteria co-operating with comparator means and multiple close loop feedback means.

Typically, the storage means in which the various sets of instructions are stored, the storage means in which the said set of strategies is stored, the storage means in which the said selected strategy is stored, the storage means in which the said portfolios of investments, the storage means in which the said selected portfolio of investments, the storage means in which the said sets of time series, the storage means in which the said selected set of time series, the storage means in which the said genetic algorithm models, the storage means in which the said selected genetic algorithm model is stored, the storage means in which the said selected execution mode is stored, the storage means in which the said selected time frame is stored, the storage means in which the said selected discrete time interval is stored, the storage means in which the said selected time mode is stored, the storage means in which the said parameters is stored, the storage means in which the said determined parameters are stored, the storage means in which the created sequence of specifications are stored, the storage means in which the said intermediate plurality of sequence of results are stored, the storage means in which the said created partly intermediate values of multi-objective function are stored, are the same.

Alternatively, wherein, at least one amongst the storage means in which the various sets of instructions are stored, the storage means in which the said set of strategies is stored, the storage means in which the said selected strategy is stored, the storage means in which the said portfolios of investments, the storage means in which the said selected portfolio of investments, the storage means in which the said sets of time series, the storage means in which the said selected set of time series, the storage means in which the said genetic algorithm models are stored, the storage means in which the said selected genetic algorithm model is stored, the storage means in which the said selected execution mode is stored, the storage means in which the said selected time frame is stored, the storage means in which the said selected discrete time interval is stored, the storage means in which the said selected time mode is stored, the storage means in which the said parameters are stored, the storage means in which the said determined parameters are stored, the storage means in which the created sequence of specifications are stored, the storage means in which the said intermediate plurality of sequence of results are stored, the storage means in which the said created partly intermediate values of multi-objective function are stored, is remotely located.

Still further, at least one of the storage means in which the various sets of instructions are stored, the storage means in which the said set of strategies is stored, the storage means in which the said selected strategy is stored, the storage means in which the said portfolios of investments, the storage means in which the said selected portfolio of investments, the storage means in which the said sets of time series, the storage means in which the said selected set of time series, the storage means in which the said genetic algorithm models are stored, the storage means in which the said selected genetic algorithm model is stored, the storage means in which the said selected execution mode is stored, the storage means in which the said selected time frame is stored, the storage means in which the said selected discrete time interval is stored, the storage means in which the said selected time mode is stored, the storage means in which the said parameters are stored, the storage means in which the said determined parameters are stored, the storage means in which the created sequence of specifications are stored, the storage means in which the said intermediate plurality of sequence of results are stored, the storage means in which the said created partly intermediate values of multi-objective function are stored, is temporary.

Still further at least one amongst the storage means in which the various sets of instructions are stored, the storage means in which the said set of strategies is stored, the storage means in which the said selected strategy is stored, the storage means in which the said portfolios of investments, the storage means in which the said selected portfolio of investments, the storage means in which the said sets of time series, the storage means in which the said selected set of time series, the storage means in which the said genetic algorithm models are stored, the storage means in which the said selected genetic algorithm model is stored, the storage means in which the said selected execution mode is stored, the storage means in which the said selected time frame is stored, the storage means in which the said selected discrete time interval is stored, the storage means in which the said selected time mode is stored, the storage means in which the said parameters is stored, the storage means in which the said determined parameters are stored, the storage means in which the created sequence of specifications are stored, the storage means in which the said intermediate plurality of sequence of results are stored, the storage means in which the said created partly intermediate values of multi-objective function are stored, is linked to the database containing information about the investments traded in the exchanges.

In accordance with a preferred embodiment of this invention, the comparator means is a processing means having a stored set of convergence instructions for comparing the intermediate values of a multi-objective function with the set convergence criteria.

BRIEF DESCRIPTION OF THE DRAWINGS

The invention will now be described with reference to the accompanying drawings, in which

FIG. 5 shows a sample of the raw data to be used in the method and apparatus for this invention;

FIG. 6 shows a sample of the polarized data to be used in the method and apparatus for this invention.

Strategy

Figure 1:
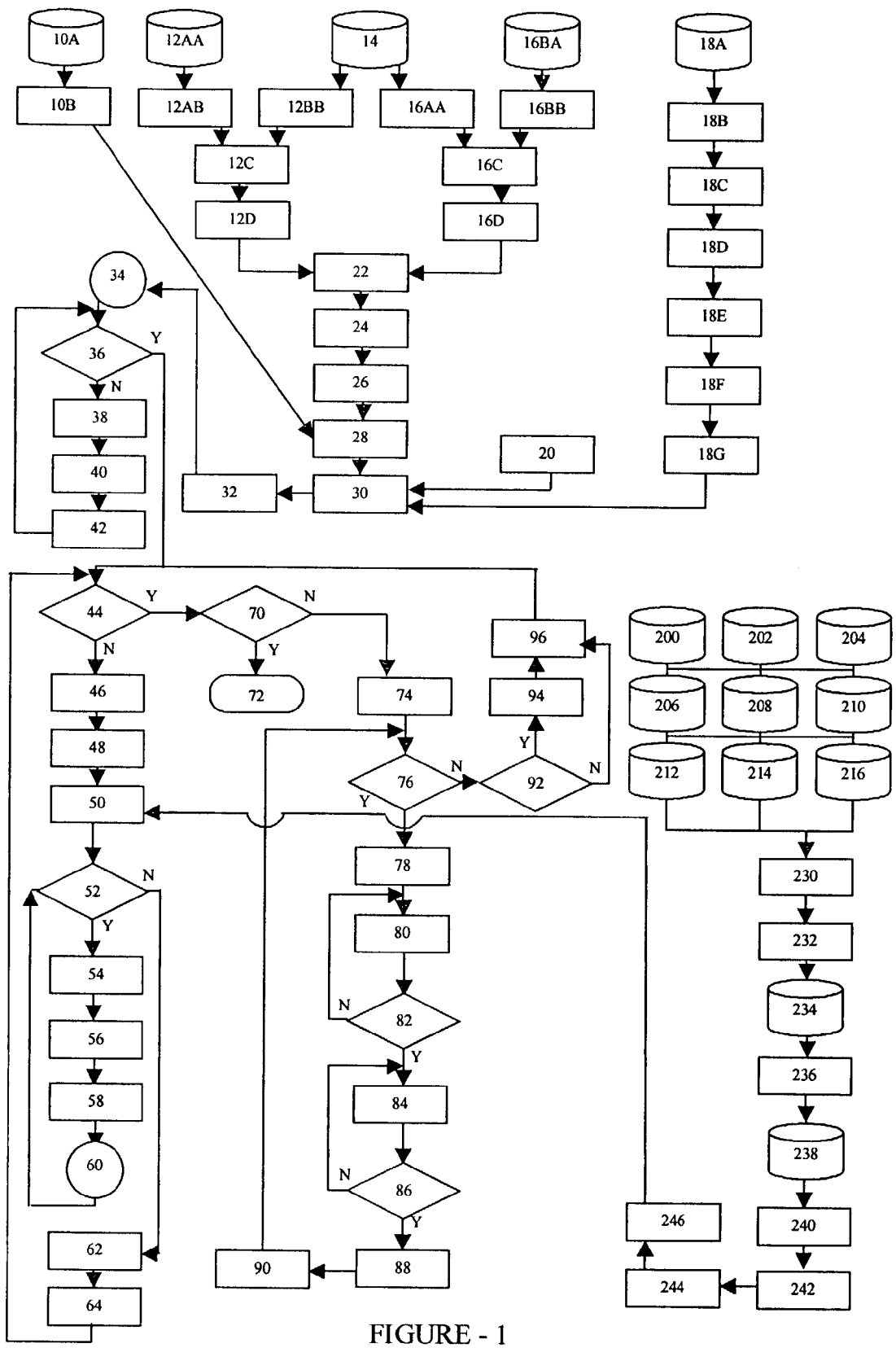
FIG. 1 shows the main flow chart of the method of this invention.

A strategy is a trading rule or a combination of trading rules that may be applied to a set of financial instruments for analyzing their performance with respect to profit maximization, risk minimization and the like over a specific duration.

Trading strategy refers to the way, the method, and the rules following, which one buys and sells instruments. A good trading strategy should be one that optimizes one's chance of making profits while keeps the risks in check.

Strategy Parameters

These are attributes, which influence the decisions of trading. Different values for parameters of a given strategy can give different results. These are typically weights, observation periods, past bars considered, smoothening factor.

Portfolio

A portfolio is a collection of financial investments. These financial investments may be equities, bonds, derivatives, currencies, and others.

Tick Data

Tick is an upward (up tick) or downward (downtick) movement in a security's price, also called minimum fluctuation. Tick data gives dealing price of every transaction of an instrument in that exchange, date and time when the deal is struck and the volume of transaction at that time.

Open-High-Low-Close-Volume (OHLCV) Bars

Different types of bars are referred to as OHLCV bars. They reflect the Open, High, Low, Close prices and traded Volume during the corresponding time interval.

ISIN

ISIN stands for International Security Identification Number. The code was devised by the ISO (International Standards Organization) to help with settlement of security transactions, which have become increasingly, globalized since the 1980s. It is intended eventually to replace SEDOL, Valoren, CINS and other international coding systems. Because of increased use and demand by customers, this code is now needed to be supported on a Datastream.

Index

In the stock market, an index is a device that measures changes in the prices of a basket of shares, and represents the changes using a single figure. The purpose is to give investors an easy way to see the general direction of shares in the index. The FTSE 100, for example, is calculated by taking a weighted average of the share prices of the largest 100 companies on the London Stock Exchange.

Time Series

Time series is a continuous array of prices associated with a date and time stamp. These are generally used for purpose of analyses.

Time Series Expression

Time Series expression is any mathematical expression that is derived from the open, high, low, close and volume data.

Exchanges

An exchange is basically a place where instruments can be traded. It provides facilities for various brokers and traders to come together interact for the purpose of trading instruments. The facility may be in the form of a trading floor where members may congregate, or in the form of trading terminals where information of trades in the exchange is made available in electronic form. Only members of an exchange may trade in the exchange. The exchange also helps in reducing the risk against defaulting by the counter party in a trade. The exchange does this through a Clearance Corporation, which takes some amount of money from the trading parties as guarantee against default.

Trading Sessions/Session Timings of an Exchange

An exchange allows trading activities to take place only during certain time intervals known as "trading sessions". The timings for the trading sessions are fixed by the exchange for the different days of the week. An exchange may have one or more trading sessions in a day. Each trading session in an exchange may be restricted to only certain instrument(s).

Significance of Time Zone

Each exchange lies in a particular time zone. The local time followed at an exchange will be different from the local time of another exchange lying in a different time zone. The time zone information of any location contains a GMT offset and the Daylight Saving Time (DST) information, if any. When comparing trades in various exchanges, it is important to convert the local times of the exchanges involved to standard time zone information, by taking into account the GMT offsets and DST information. Hence all timings considered are available as GMT-DST. This ensures that trades with the same time stamp are taken into account during any operations. In case of multiple exchanges having the same GMT and DST offsets, this conversion is not required, and the local times may be directly used.

Trading is Possible in the Scenario Envisaged in Accordance with this Invention

In any exchange, trading is possible only if the current date-time is not a holiday and is within valid session timings. In case multiple exchanges are considered, trading is possible in only those exchanges where the current date-time is not a holiday and falls within valid session timings.

Time Stepping

Time stepping is a process by which, given a date-time, the next valid date-time can be obtained according to a specified time interval. The time interval could be the strategy execution interval or the report-printing interval. The output date-time value is used for the next execution of the strategy. Time stepping increments the given date-time value by the given time interval. If the resulting date-time is not on a common holiday and lying within valid session timings, then the value is returned. Else it is incremented till it is not on a common holiday and lying within valid session timings, and then the value is returned.

Holidays

Holidays are days on which exchanges are not open for trading. The holiday information for exchanges are to be considered by the system to ensure that time stepping takes place properly and trading does not take place on holidays. Holiday information has to be made available with the corresponding time-zone information, especially when dealing with intra-day trading.

Common Holidays

In case of daily trading, if multiple exchanges are being considered, even if one exchange is having a holiday, trading can take place in another exchange that is open. Therefore, only the holidays common to all exchanges are to be taken into account.

Maximum Drawdown

Consider a strategy that has made huge net profits. It is imperative to study the pattern of profit making of this particular strategy by putting each and every trade executed by this strategy under a microscope. It is quite possible that the strategy might have incurred huge losses and later on recovered from these. But in the real world, this strategy will not be considered robust at all. Simply put after incurring such heavy losses in the initial period the trader will be asked to quit. Hence it is necessary to mitigate this risk. One way to do this is to look at maximum dip between two equity highs. In other words it is the drop in the portfolio value compared to the maximum returns achieved in the past. Strategy parameters that give a minimum value of maximum drawdown are more desirable.

Individual

The genetic algorithm starts on a set of results that form a part of the space of all feasible results to a problem. Each result in the set is considered to be an individual. The individuals are represented as binary encoding of the result. This binary encoding is generally in the form of a fixed-point concatenated binary string.

The Fitness Function

Like all optimization techniques, genetic algorithm requires a measure of the utility of its proposed results. This measure is provided by the fitness function The fitness function merely takes the parameter set associates with the individual in question and returns a measure of its utility—be it Profit/Loss, Maximum Drawdown.

Generation

The standard genetic algorithm proceeds as follows: An initial population of individuals is created at random. These individuals in the current population are decoded and evaluated according to some predefined quality criterion, referred to as the fitness, or fitness function. This leads to the finding of robust results in the given search space. It is necessary to create the next generation of individuals to continue the search for fitter results in the search space. In order to achieve this, individuals are selected in pairs. The selected pairs are then subjected to crossover and mutation to get a pair of new individuals. The steps of selection, crossover and mutation are repeated till a new population of individuals is created. All these aforesaid steps constitute a generation. These generations are performed until the convergence criterion is met.

Parent

A genetic algorithm is started with a set of results that form a part of the space of all feasible results. The main motivation is to create a new set of results that might be fitter than the previous one. The set of results or individuals that is operated on by various operators such as selection, crossover and mutation to form the new set is termed as the parent population and the individuals in this set are termed as parents.

Offspring

A genetic algorithm is started with a set of results (represented by individuals) called a population. Selection of parent individuals alone cannot introduce any new individuals into the population, i.e., it cannot find new points in the search space. Genetically inspired operators, like crossover and mutation, help generate new individuals. Crossover is performed with the crossover probability between two selected individuals, called parents, to form two new individuals, called offspring. This operator tends to enable the evolutionary process to move toward promising regions of the search space. The mutation operator is introduced to prevent premature convergence to local optima by randomly sampling new points in the search space.

Investment

The assets such as securities, fixed income instruments and others, purchased, with a primary view to their financial return are called investments. The returns can be in the form of income or capital gains. Investments may carry a risk such as credit risk or interest risk. Investments are done according to set objectives that vary with investors. Investors devise investment strategies to maximize returns on these investments.

Convergence

Genetic algorithms are stochastic iterative processes that are not guaranteed to converge. The termination condition or convergence may be specified as some fixed, maximal number of generations or as the attainment of an acceptable fitness level. Specifying the convergence criterion helps in termination of generations.

DETAILED DESCRIPTION OF THE DRAWINGS

Now referring to FIG. 1 of the accompanying drawings. FIG. 1 shows the main flow chart of the method of this invention for strategy independent optimization of a multi-objective function of a portfolio containing at least one investment, the following blocks represent the step in the method mentioned alongside:

Block 10A: Storing of pre-determined strategies
Block 12AA: Storing of pre-determined portfolios of investments
Block 12AB: Selecting a portfolio of investment
Block 14: Storing of investments in the portfolio
Block 12BB: Selecting at least one investment to create a portfolio of investment
Block 12C: Initializing the returns on investments of the portfolio
Block 12D: Initializing the positions of the said investments of the portfolio
Block 16AA: Selecting at least one investment to create a time series
Block 16BA: Storing of pre determined sets of time series
Block 16BB: Selecting a set of time series
Block 16C: Modifying the expression of the time series
Block 16D: Modifying the discrete time interval of time series
Block 18A: Storing of genetic algorithm models
Block 18B: Selecting a method for selection/ranking in the stored models
Block 18C: Selecting a method for crossover and specifying a crossover probability
Block 18D: Selecting a method for mutation and specifying a mutation probability
Block 18E: Selecting a method for fitness
Block 18F: Selecting a convergence criterion
Block 18G: Specifying a population size
Block 22: Taking intersection of sets of durations of time intervals
Block 24: Finding minimum discrete time interval from discrete time interval of each time series
Block 26: Specifying a time mode
Block 28: Determining optimization amenable parameters of strategy
Block 30: Creating and storing sequence of specifications
Block 32: Making provisions for parallel execution
Block 34: Creating a mutually exclusive sets of discrete session timings
Block 36: checking and determining whether the population size is smaller than specified size.
Block 38: Creating a new individual
Block 40: Representing the individual as a bit string
Block 42: Adding the individual to the population
Block 44: checking and determining whether the strategy is executed for each individual of the population.
Block 46: Getting the next individual
Block 48: Getting the set of parameters from the bit string representation
Block 50: Fetching polarized data for the portfolio of investments and the set of time series
Block 52: Finding out if current strategy time is within the time frame
Block 54: Aligning the time stamp of each time series in the set of time series and each investment in portfolio of investments
Block 56: Applying the rules of the strategy
Block 58: Calculating the returns on portfolio of investments
Block 60: Time stepping
Block 62: Storing the results with the individual
Block 64: Calculating the fitness for an individual using its results
Block 70: checking and determining whether the convergence criteria are met.
Block 72: Stopping
Block 74: Creating an offspring population with size zero
Block 76: checking and determining whether the offspring population size is smaller than specified size.
Block 78: Selecting two individuals from the parent population using the specified selection method
Block 80: Performing crossover of these two individuals using specified crossover method and specified crossover probability
Block 82: checking and determining whether the each parameter from set of parameters, represented by individuals, falls within set bounds.
Block 84: Performing mutation on these two individuals using the specified mutation method and the specified mutation probability
Block 86: checking and determining whether the each parameter from set of parameters, represented by individuals, falls within set bounds.
Block 88: Representing each individual as a bit string
Block 90: Adding the two individuals to the offspring population
Block 92: checking and determining whether the specified population size is odd.
Block 94: Removing one individual from offspring population
Block 96: Replacing parent population with offspring
Block 200: obtaining Raw tick data
Block 202: obtaining Raw ISIN data
Block 204: obtaining Raw exchange data
Block 206: obtaining Raw currency data
Block 208: obtaining Raw time zone data
Block 210: obtaining Raw index data
Block 212: obtaining Raw cash flow data
Block 214: obtaining Raw balance sheet data
Block 216: obtaining Raw income statement data
Block 230: Extracting relevant data from raw data
Block 232: Linking the elements of the extracted data
Block 234: obtaining Intermediate pre filtered data
Block 236: Deleting spurious data
Block 238: Filtering the data
Block 240: Renaming to account for investments, which underwent a change in name
Block 242: Adjusting for multiple records having the same time stamp Block 244: Creating open, high, low, close, volume bars for discrete time intervals Block 246: Creating records whose values correspond to evaluation of expressions based on open, high, low, close and volume bars.

The process represented in FIG. 1, consists essentially of a method generally indicated by the numeral 10 for strategy independent optimization of a multi-objective function of a portfolio containing at least one investment comprises the steps of.

[1] setting the execution mode [block 20 of the flow chart in FIG. 1].

[2] selecting a strategy [block 10b of the flow chart in FIG. 1] defined by a set of rules from a stored set of strategies containing at least one strategy [block 10a of the flow chart in FIG. 1];

[3] identifying a portfolio of investments [block 12aa of the flow chart in FIG. 1], consisting of at least one investment, whose multi-objective function has to be optimized.

[4] identifying a set containing a plurality of time series in relation to investment consisting of at least one time series [block 16bb of the flow chart in FIG. 1].

[5] defining the environment [blocks 22,24,26 of the flow chart in FIG. 1] including a time frame in which the multi-objective function has to be optimized, a discrete time interval and mode in accordance with standard time.

[6] determining a set of parameters of the selected strategy amenable for optimizing [block 28 of the flow chart in FIG. 1].

[7] creating a genetic algorithm model [blocks 18a to 18g of the flow chart in FIG. 1] which includes its convergence;

[8] creating a sequence of specifications [block 30 of the flow chart in FIG. 1] for the determined set of parameters of the selected strategies in the context of the said environment for the said genetic algorithm model for the said portfolio of investments for the said set of time series.

[9] storing the created sequence of specifications [block 30 of the flow chart in FIG. 1] in the memory of a first set of processing units containing at least one processing unit.

[10] collating raw data [blocks 200 to 242 of the flow chart in FIG. 1] relating to the said portfolio of investments, the said set of time series, and the information about the said environment.

[11] polarizing the collated data by eliminating noise [block 244, 246 of the flow chart in FIG. 1] and storing the polarized data [block 244,246 of the flow chart in FIG. 1] in the memory of a second set of processing units containing at least one processing unit.

[12] fetching the polarized data [block 50 of the flow chart in FIG. 1] from its stored location and transposing it for the purpose of iteration [block 50 of the flow chart in FIG. 1] using the said strategy in the environment.

[13] processing the polarized data in accordance with the rules of the said strategy [blocks 52 to 60 of the flow chart in FIG. 1] for its sets of determined parameters for the said set of time series for the said time frame for the said discrete time interval for the said portfolio of investments in the environment to generate a sequence of results [blocks 52 to 60 of the flow chart in FIG. 1].

[14] storing the sequence of results [block 62 of the flow chart in FIG. 1] in the memory of a third set of processing units containing at least one processing unit.

[15] generating a set containing a plurality of said sequence of results [blocks 36 to 64 of the flow chart in FIG. 1] obtained by varying the sets of determined parameters for the said strategy for the said set of time series for the said time frame for the said discrete time interval for the said portfolio of investments in the said environment.

[16] storing, in the memory [block 62 of the flow chart in FIG. 1] of a fourth set of processing units containing at least one processing unit the said set containing a plurality of said sequence of results generated by varying the sets of determined parameters for the said strategy for the said set of time series for the said time frame for the said discrete time interval for the said portfolio of investments in the said environment.

[16] applying [block 36 to 96 of the flow chart in FIG. 1] the said genetic algorithm model to the created and stored set containing the plurality of said sequences of results to create at least one intermediate generation of partly or filly optimized multi-objective function [block 64 of the flow chart in FIG. 1] of the said portfolio of investments and generating at least one set of determined parameters.

[17] repeating the steps of the method commencing from generating a set containing a plurality of said sequence of results [block 44 of the flow chart in FIG. 1] and ending with applying the genetic algorithm model to obtain a plurality of intermediate generations of partly or fully optimized multi-objective function [block 64 of the flow chart in FIG. 1] of the said portfolio of investments until the optimized levels of said portfolio of investments meet the said convergence criteria specified in the said genetic algorithm model [block 70 of the flow chart in FIG. 1].

Figure 2:
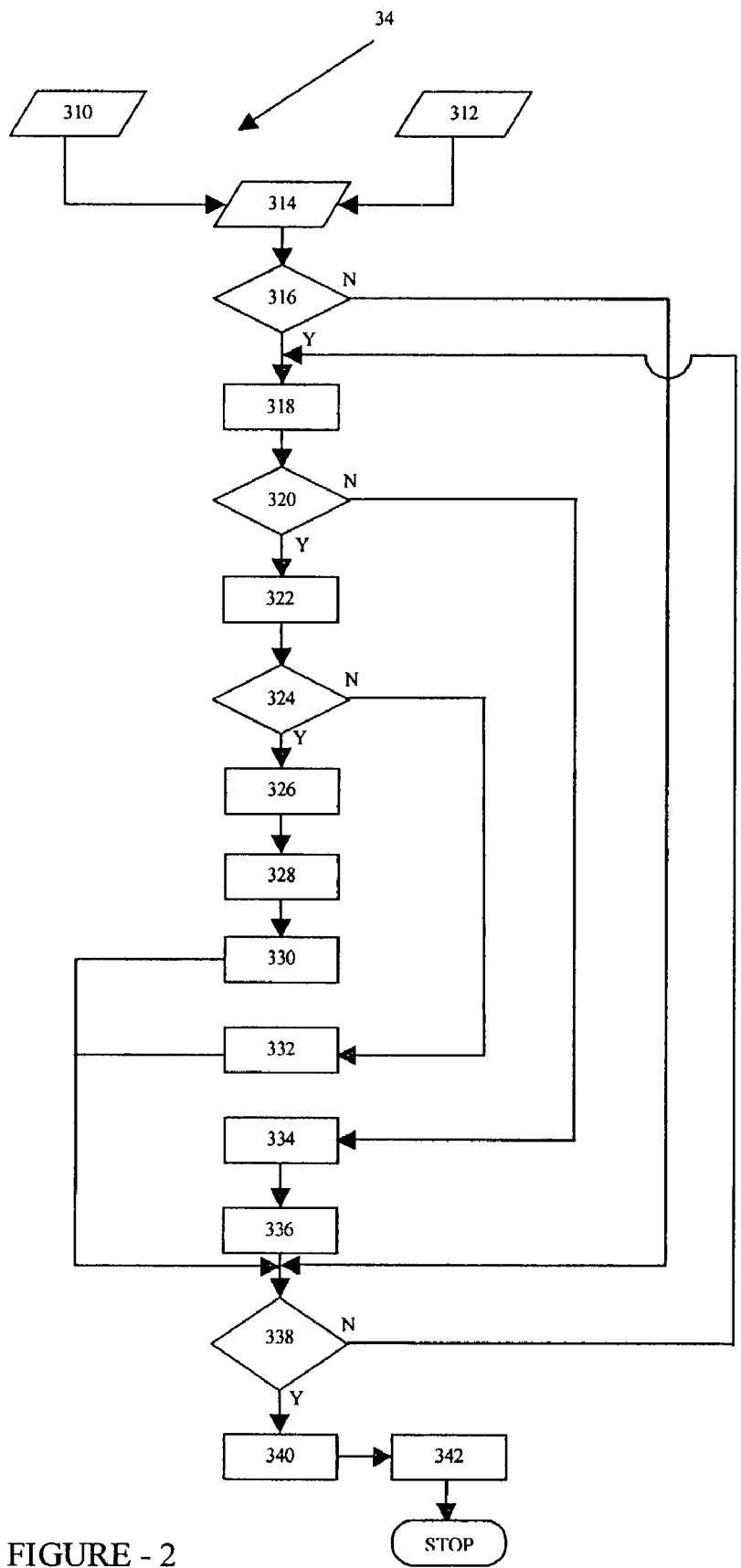
FIG. 2 shows the flow chart of the building sessions in the method shown in FIG. 1.

FIG. 2 illustrates the operations involved in creating a mutually exclusive sets of discrete session timings as shown in block 34 of FIG. 1.

The execution mode in block 20 can be set in parallel or sequential.

Examples of a multi-objective function for a portfolio of investment is return maximization or risk minimization.

The investments may include one or more combinations of investments, such as, stocks, fixed income securities, derivatives, and currencies.

A portfolio of investments can be created from a universe of investments by selecting at least one investment and the information related there to such as its price and duration as stored in the database of a selected exchange thereby creating a set of durations corresponding to the selected investments in the selected exchange wherein each element in the said set of durations has a start time and an end time.

A portfolio of investments may be identified by selecting a portfolio of investments from a pre-determined stored set of portfolios of investments with or without modifications of an investment in the selected portfolio and initializing the returns on the investments of the portfolio.

Identifying a set of time series includes the step of creating a set of time series associated with investment information related there to such as its price and duration as stored in the database of an selected exchange, along with its other attributes such as discrete time interval and expression (as herein defined) thereby creating a set of durations corresponding to the selected time series in the selected exchange wherein each element in the said set of durations has a start time and an end time.

Further, identifying a set of time series can include the step of selecting a set of time series from a predetermined stored sets of time series with or without modifications.

Defining the environment can be done in terms of the time frame, discrete time interval as will hereinafter be defined and mode in accordance with standard time and defining the environment in terms of the discrete time interval may include the step of obtaining the minimum value of the discrete time interval from the set of discrete time intervals of the said time series. And may also include the step of obtaining the intersection of the said set of duration of time intervals corresponding to the set of time series with the said set of duration of time intervals corresponding to the investments in the portfolio.

Determining the optimization amenable parameters to obtain a set of determined parameters of the selected strategies can include the step of identifying the correlation of the various parameters of the strategy.

A genetic algorithm model can be created by including the steps of specifying a method of calculating fitness, specifying a method of ranking, selecting a crossover probability, specifying a method for crossover, selecting a mutation probability, specifying a method for mutation, selecting a convergence criteria and specifying a population size to obtain a genetic algorithm model.

Creating the sequence of specifications includes the steps of collating information relating to the said strategy, collating information relating to the said environment, collating information relating to the said portfolio of investments, collating information relating to the said set of time series, collating information relating to the said genetic algorithm model, then sequentially listing as classes and objects, creating linkages between the sequentially listed objects and classes and invoking methods of these sequentially listed objects and classes and the number of processing units to be deployed for execution selected from the said sets of processing units to create the said sequence of specifications.

Collating the raw data includes the steps of inputting the raw data from at least one data source, pre-filtering the received data into an intermediately pre-filtered data storage means and linking the elements of the extracted data for the purpose of collation.

Polarization of the collated data is effected by filtering spurious records, renaming for organizing, adjusting the time based volume and prices of the elements of the collated data and generating Open-High-Low-Close-Volume bars corresponding to the set of discrete time intervals to obtain polarized data.

The processing of the polarized data for applying the rules of the strategy includes the steps of forming mutually exclusive sets of discrete session timings and includes the steps of selecting the processing units from the said sets of processing units on which the execution is required to take place, iteratively applying rules of the said strategy for the said set of determined parameters; calculating the sequence of results; incrementing time using the said discrete time interval and adjusting for the said mutually exclusive sets of discrete session timings for the entire time frame.

Creating the set of plurality of sequence of results includes applying at least a part of the genetic algorithm model to the set of determined parameters to create a population of sets of determined parameters and applying the said strategy including its rules to each and every individual of the population of the sets of determined parameters of the processed polarized data.

Storing of the said sequence of results is in a one-to-one mapping with respect to the individuals of the population of the sets of determined parameters.

Applying the genetic algorithm model to the created and stored set containing the plurality of said sequences of results includes the steps of selecting the processing units from the said sets of processing units on which the execution is required to take place, calculating fitness of each and every individual of the population of the sets of determined parameters using selected fitness function; ranking the individuals using the selected method of ranking; creating an offspring population of individuals of the said population size by applying selected crossover method with said crossover probability and selected mutation method with the said mutation probability to create an offspring population of individuals of determined set of parameters and includes iterating the aforesaid steps to obtain generations of offspring and applying the convergence criteria to the number of iterations to verify that desired optimization is achieved.

Applying the genetic algorithm model includes the step of applying the convergence criteria to the individuals of the generated offspring to verify that desired optimization is achieved.

Referring to FIG. 2, there is shown a sub routine for creating a mutually exclusive set of session timings for use in the process of the method of this invention which consists of the following blocks:

Block 310: which involves making an Input List (IL)—List of durations (a start date (ST) and end date (ED)), each of them having a list of trading sessions that remain unchanged within that duration.

Block 312: which involves making an Output List (OL) which is empty and to be flooded with the durations containing a list of valid trading sessions Block 314: IL, which involves sorting in ascending order of the start dates of the durations Block 316: checking and verifying whether the IL contains more than one element?

Block 318: which involves calling the first record in IL the current record (CR)

Block 320: involves checking and verifying whether there is a record in IL with ST different from ST of CR.

Block 322: which involves calling the first record in IL with ST different from ST of CR the break record (BR) and other records in IL before BR are called as the iterated records (IR)

Block 324: involves checking and verifying whether there is any ED (IR)<ST (BR) for some IR.

Block 326: which involves calling the minimum of ED (IR) as "m"

Block 328: which involves finding sessions say X1, X2, . . . , Xn for the duration {CR, BR−1} and adding the duration {ST (BR), m} and sessions X1, X2, . . . , Xn to OL Block 330: which involves deleting all the records of IL with ED=m and set ST of remaining records i.e., ST (IR) to m+1

Block 332: which involves adding duration {ST (CR), ST (BR−1)} and sessions of all IR to OL and making ST of all records in IL equal to ST (BR)

Block 334: which involves calling the minimum of EDs "n"

Block 336: which involves deleting all records of IL with ED=n and set ST of remaining records to n+1

Block 338: involves checking and verifying whether the IL contains only one element.

Figure 3:
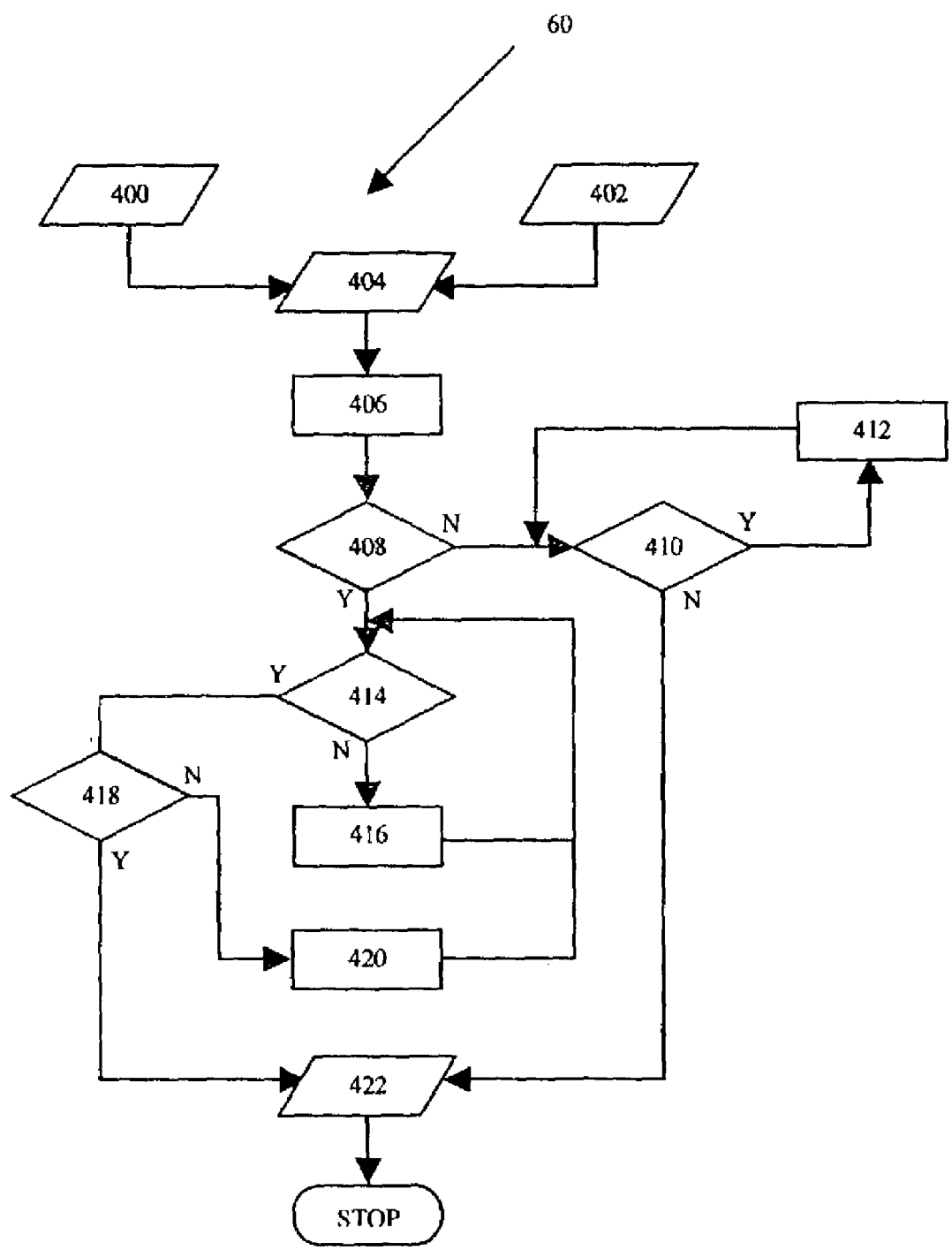
FIG. 3 shows the flow chart for time stepping for the method shown in FIG. 1.

Block 340: which involves adding the durations along with the valid sessions to OL Block 342: which involves merging and aligning the sessions within the durations in the OL Referring to FIG. 3, there is shown a sub routine for time stepping which is block 60 in FIG. 1 for use in the process of the method of this invention which consists of the following blocks:

Block 400: which involves listing of valid sessions

Block 402: which involves listing of common holidays

Block 404: which involves inputting date time, DT that contains a date part and a time part Block 406: which involves adding the minimum discrete time interval to DT and storing it as NEXT_DT Block 408: involves checking and verifying whether the minimum discrete time interval is daily.
Block 410: involves checking and verifying whether if the minimum discrete time interval is daily, whether NEXT_DT a holiday.
Block 412: which involves incrementing NEXT_DT by a day
Block 414: involves checking and verifying whether if the minimum discrete time interval is not daily, is date part of NEXT_DT within bounds of the duration in the list of valid sessions.
Block 416: which involves skipping to the next duration in the list
Block 418: involves checking and verifying whether the time part of the NEXT_DT lies in the list of valid sessions in that duration.
Block 420: which involves incrementing NEXT_DT to the next valid session and adding the minimum discrete time interval to it
Block 422: which involves returning NEXT_DT FIG. 4 is a flow chart showing the apparatus in accordance with this invention.

Figure 4:
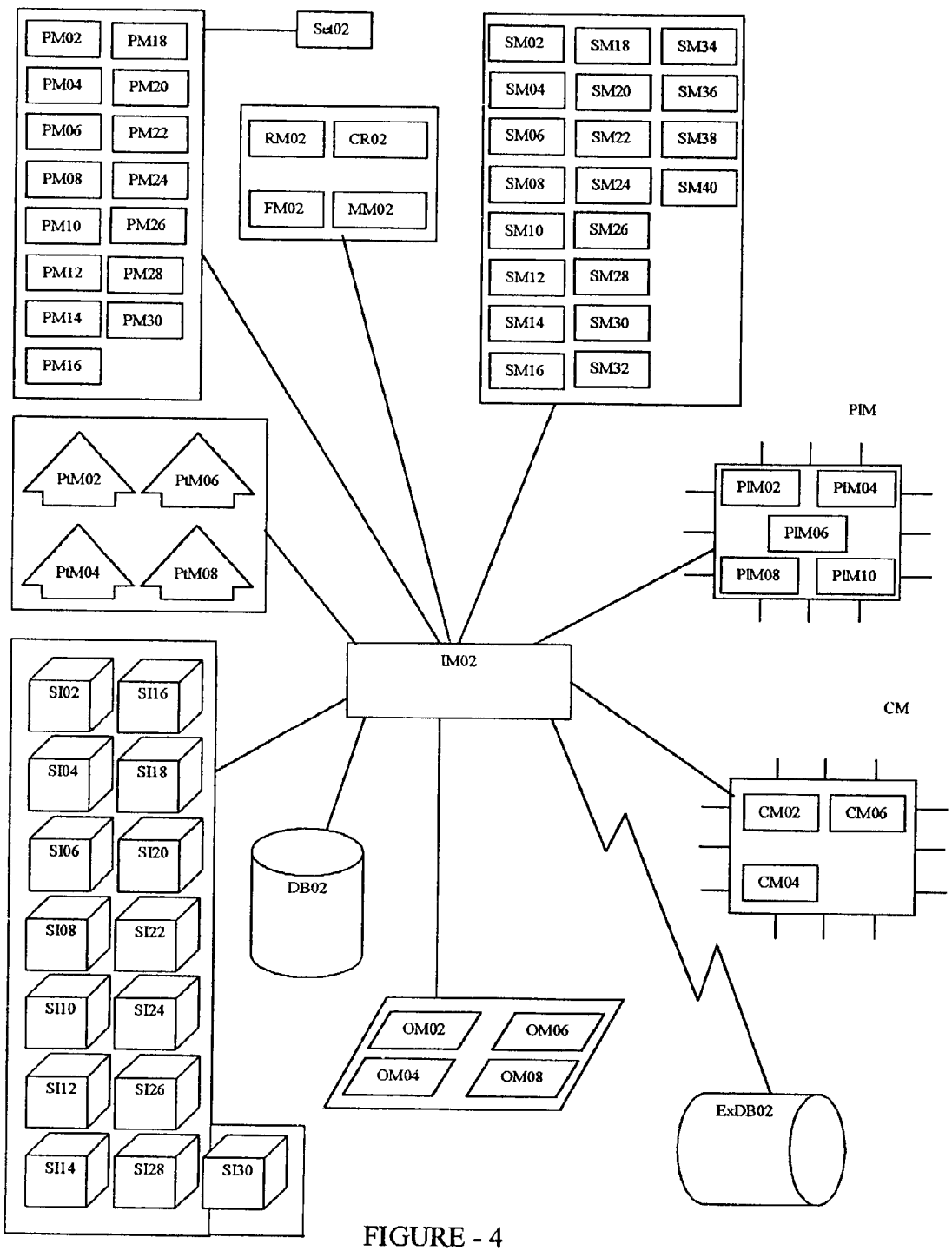
FIG. 4 shows the flow chart showing the apparatus for the method of this invention.
Figure 7A:
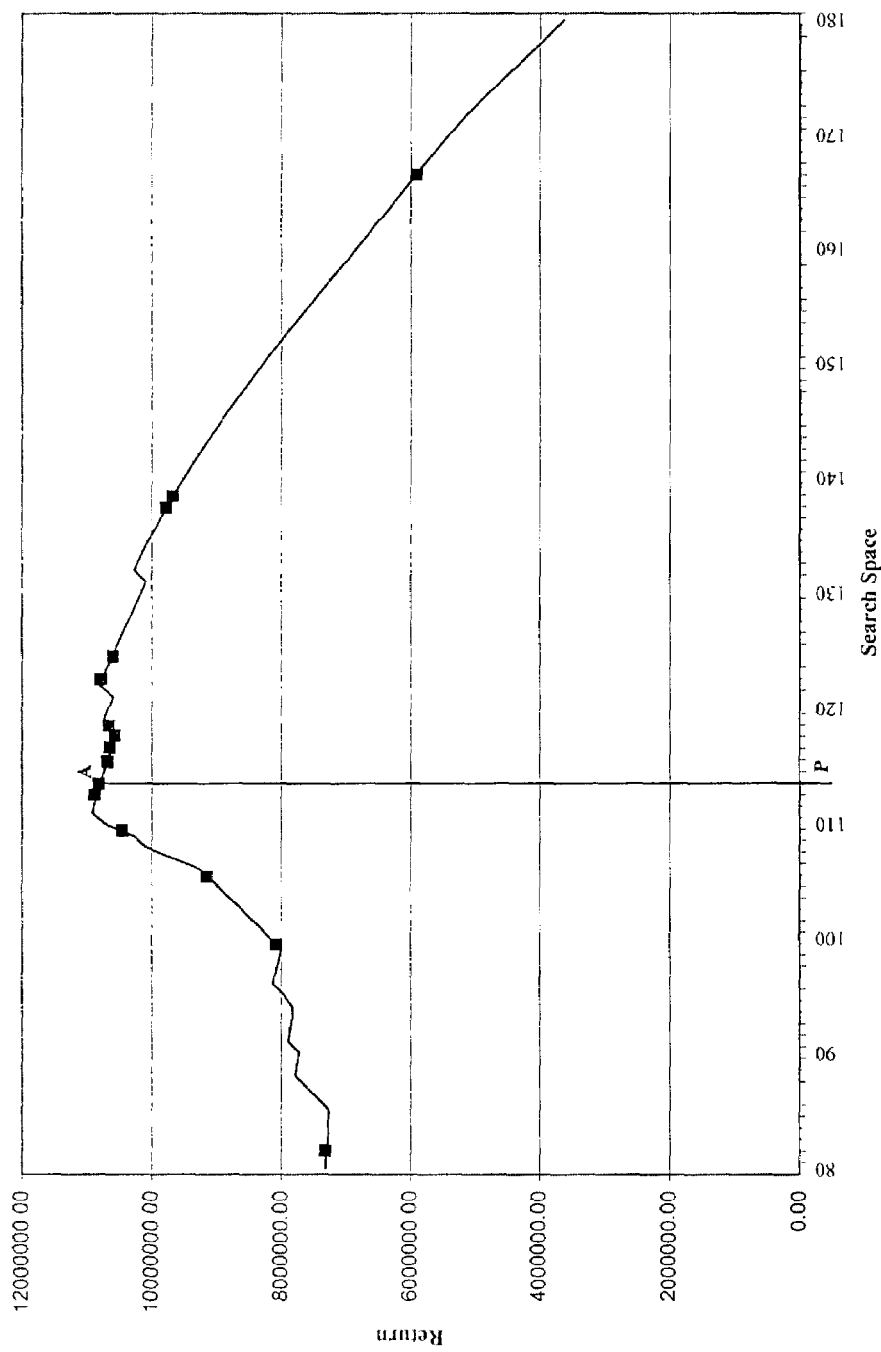
FIGS. 7a, 7b, 7c show examples of reports generated in accordance with this invention In this specification the following terms are deemed to be defined as follows.
Figure 7B:
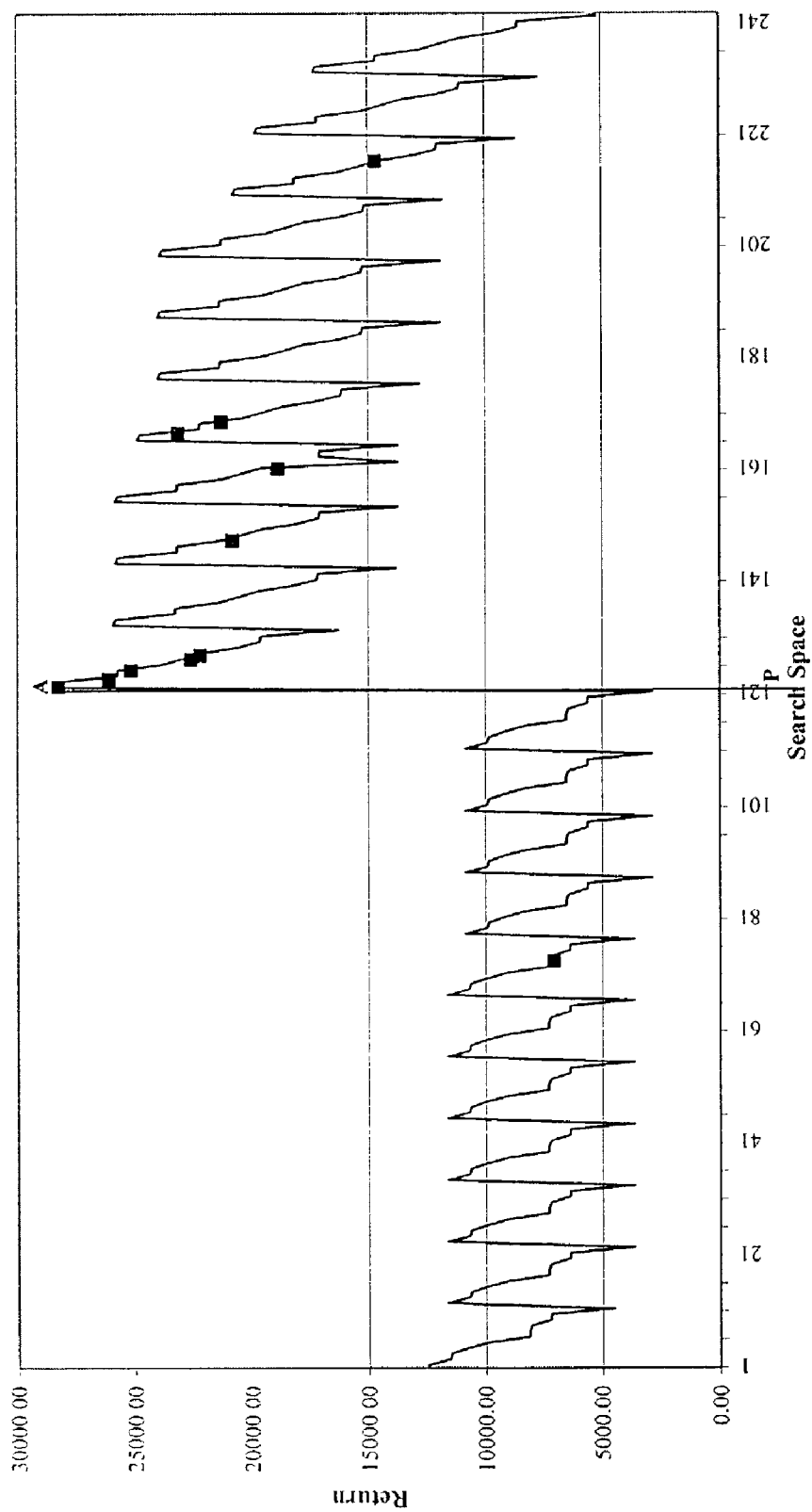
Figure 7C:
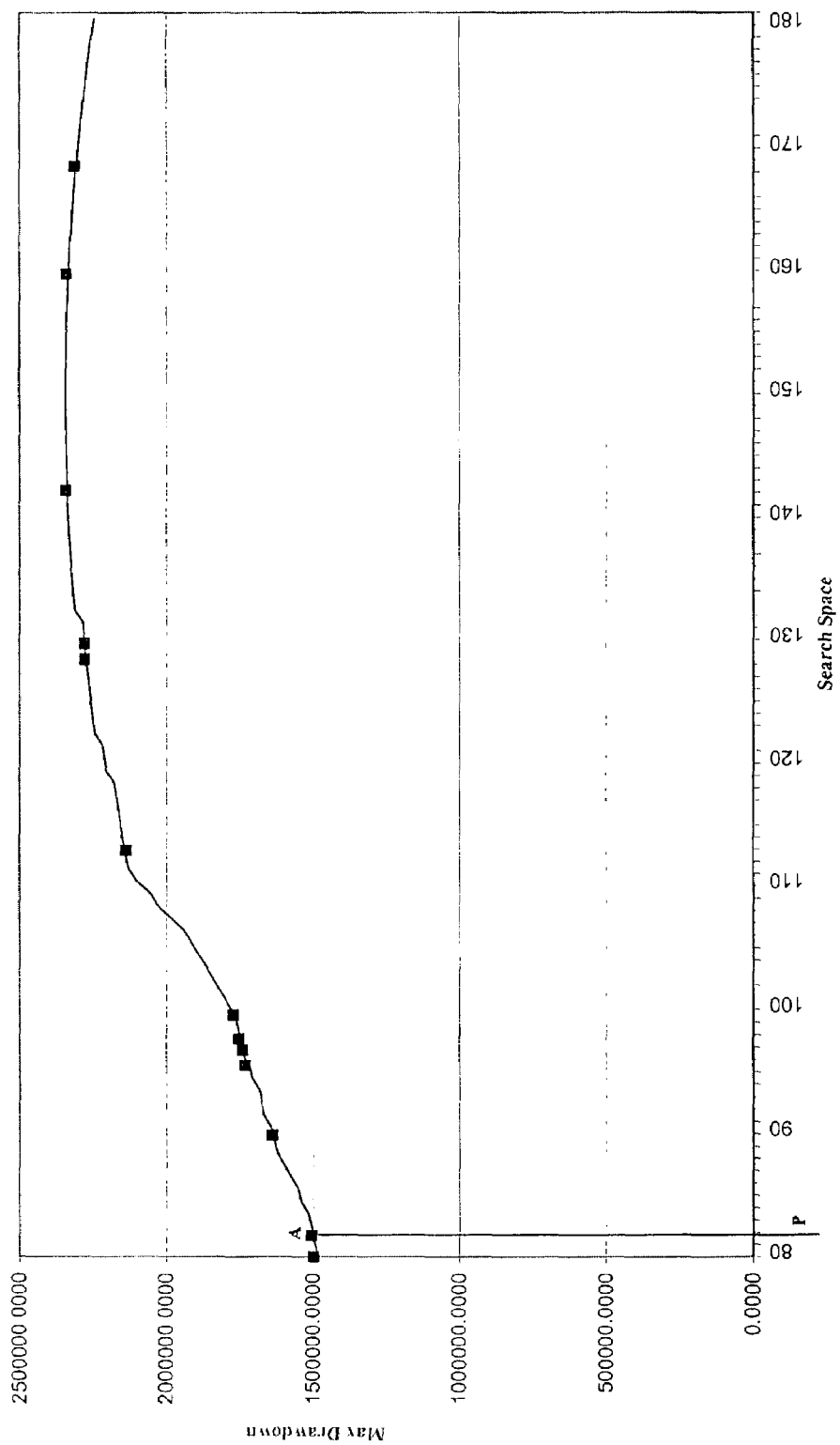

Referring to FIG. 4 the following blocks represent the following apparatus
Block PM02: processing means—execution mode
Block PM04: processing means—strategy and its determined parameters
Block PM06: processing means—portfolio of investments
Block PM08: processing means—set of time series
Block PM10: processing means—genetic algorithm model
Block PM12: processing means—Sequence of specifications
Block PM14: processing means—Process polarized data
Block PM16: processing means—Generate a set containing a plurality of sequence of results
Block PM18: processing means—Create at least one intermediate generation of partly or fully optimized returns
Block PM20: processing means—Generate at least one set of determined parameters
Block PM22: Transposing means
Block PM24: Multiple close loop feedback means
Block PM26: Comparator means
Block PM28: Defining the environment
Block PM30: processing means cooperating with Storage means in which sequence of results is stored
Block SM02: Storage means—Sets of instructions
Block SM04: Storage means—Set of strategies
Block SM06: Storage means—Selected strategy
Block SM08: Storage means—Portfolio of investments
Block SM10: Storage means—Selected portfolio of investments
Block SM12: Storage means—Sets of time series
Block SM14: Storage means—Selected set of time series
Block SM16: Storage means—genetic algorithm models
Block SM18: Storage means—Selected genetic algorithm models
Block SM20: Storage means—Execution mode
Block SM22: Storage means—Time frame
Block SM24: Storage means—Discrete time interval
Block SM26: Storage means Time mode
Block SM28: Storage means—Parameters
Block SM30: Storage means—Determined parameters
Block SM32: Storage means—Sequence of specifications
Block SM34: Storage means—Raw data
Block SM36: Storage means—Polarized data
Block SM38: Storage means—intermediate plurality of sequence of results
Block SM40: Storage means—partly intermediate values of multi-objective function
Block PtM02: Pointing means—Select strategy
Block PtM04: Pointing means—Select portfolio of investments
Block PtM06: Pointing means—Select set of time series
Block PtM08: Pointing means—Select genetic algorithm model
Block SI02: Set of Instructions—Select strategy
Block SI04: Set of Instructions—Select portfolio of investments
Block SI06: Set of Instructions—Select set of time series
Block SI08: Set of instructions—Define environment
Block SI10: Set of instructions—Determine the optimization amenable parameters
Block SI12: Set of instructions—Select genetic algorithm model
Block SI14: Set of instructions—Create and store sequence of specifications
Block SI16: Set of instructions—Collate, polarize and store polarized data
Block SI18: Set of instructions—Fetch polarized data
Block SI20: Set of instructions—Process polarized data and store sequence of results
Block SI22: Set of instructions—Generate and store a set containing a plurality of sequence of results
Block SI24: Set of instructions—Apply genetic algorithm model and generate at least one set of determined parameters
Block SI26: Set of instructions—Transposing instructions
Block SI28: Set of instructions—Multiple close loop feedback instruction
Block SI30: Set of instructions—Convergence instructions
Block DB02: Database—Information relating to investment
Block ExDB01: External database—Exchanges, ISIN, Time Zones, Cash flow statements, Balance sheets, Income statements
Block CM02: Inputting means
Block CM04: Pre-filtering means
Block CM06: Linking means
Block PlM02: Noise elimination means
Block PlM04: Renaming means
Block PlM06: Adjusting means
Block PlM08: Generating means
Block PlM10: Filtering means
Block IM02: Interfacing means
Block OM02: Writing means
Block OM04: Displaying means
Block OM06: Transmission means
Block OM08: Storage means
Block Set02: Setting means
Block RM02: Ranking means
Block FM02: Fitness means
Block CR02: Crossover means
Block MM02: Mutation means The apparatus for carrying out a method for strategy independent optimization of multi-objective function of a portfolio containing at least one investment as exemplified in FIG. 4 of the drawings consists of in combination:

processing means [represented by block PM14 in FIG. 4] for receiving data and instructions and using the instructions to process the data and generate at least one result;

storage means [represented by blocks SM02 to SM40 in FIG. 4] in communication with the processing means [represented by blocks PM02 to PM26 in FIG. 4] for storing data, instructions, intermediate results, final results in discrete registers and pages adapted to co-operate with each other.

pointing means [represented by blocks PtM01 to PtM04 in FIG. 4] in communication with the said processing means [represented by blocks PM02 to PM 26 in FIG. 4] and the said storage means [represented by blocks SM02 to SM40 in FIG. 4] adapted to input data and instructions into the said processing means and the said storage means.

output means [represented by blocks OM02 to OM08 in FIG. 4] for receiving intermediate and final results from the processing means [represented by block PM18 in FIG. 4].

at least one interface means [represented by block IM02 in FIG. 4] enabling the said processing, storage, pointing and output means, to communicate with each other jointly or severally.

Set of instructions [represented by blocks SI02 to SI30 in FIG. 4] for instructing the said processing, storage, pointing, output and interface means to carry out the method.

at least one register or page in the said storage means [represented by block SM20 in FIG. 4] for storing the instructions relating to the mode of execution of the said processing means [represented by block PM02 in FIG. 4].

at least one page in the said storage means [represented by block SM04 in FIG. 4] for containing a set of strategies containing at least one strategy and their defined rules.

at least one pointing means [represented by block PtM02 in FIG. 4] in conjunction with the said processing means [represented by block PM04 in FIG. 4] instructed by the said set of instructions [represented by block SI02 in FIG. 4] adapted to select a strategy from the said set of stored strategies.

at least one database [represented by block ExDB02 in FIG. 4] containing information relating to investments;

at least one page in the said storage means [represented by block SM08 in FIG. 4] for containing a portfolios of investments each of the portfolio containing at least one investment.

at least one pointing means [represented by block PtM04 in FIG. 4] in conjunction with the said processing means [represented by block PM06 in FIG. 4] instructed by the said set of instructions [represented by block SI04 in FIG. 4] adapted to select a portfolio from the stored said portfolios of investments for optimizing the multi-objective function.

at least one page in the said storage means [represented by block SM12 in FIG. 4] for containing sets of time series each of the set containing at least one time series.

at least one pointing means [represented by block PtM06 in FIG. 4] in conjunction with the said processing means [represented by block PM08 in FIG. 4] instructed by the said set of instructions [represented by block SI06 in FIG. 4] adapted to select a set of time series from the said stored sets of time series.

at least one instruction in the said set of instructions [represented by-block SI08 in FIG. 4] for directing the said processing means [represented by block PM28 in FIG. 4] to define the environment;

at least one instruction in the said set of instructions [represented by block SI10 in FIG. 4] for directing the processing means [represented by block PM04 in FIG. 4] to determine the optimization amenable parameters for obtaining a set of determined parameters of the selected strategy.

at least one page in the said storage means [represented by block SM16 in FIG. 4] for containing a set of means [represented by block FM02 in FIG. 4] for calculating fitness containing at least one means for calculating fitness, a set of means for ranking containing at least one means for ranking [represented by block RM02 in FIG. 4], a set of means for performing crossover containing at least one means for performing crossover [represented by block CR02 in FIG. 4] and a set of means for performing mutation containing at least one means of performing mutation [represented by block MM02 in FIG. 4].

At least one pointing means [represented by block PtM08 in FIG. 4] in conjunction with the said processing means [represented by block PM10 in FIG. 4] instructed by the said set of instructions [represented by block SI12 in FIG. 4] adapted to select a means of calculating fitness, a means for ranking, a means for crossover and a means for mutation to create a genetic algorithm model.

At least one instruction in the said set of instructions [represented by block SI14 in FIG. 4] for directing the said processing means [represented by block PM12 in FIG. 4] to receive the said execution mode, strategy and its determined parameters, portfolio of investments, time series, environment and genetic algorithm model and for processing them to create a sequence of specifications and at least one page in storage means [represented by block SM32 in FIG. 4] for storing the created sequence of specifications.

At least one storage means [represented by block SM34 in FIG. 4] for containing the raw data; storage means [represented by block SM10 in FIG. 4] for containing said portfolio of investments, storage means [represented by block SM14 in FIG. 4] for containing the said set of time series, storage means [represented by blocks SM22, SM24, SM26 in FIG. 4] for containing information about the said environment, storage means [represented by block SM04 in FIG. 4] for containing strategy; storage means [represented by block SM06 in FIG. 4] for containing selected strategy; storage means [represented by block SM28 in FIG. 4] for containing general parameters; storage means [represented by block SM30 in FIG. 4] for containing determined parameters and storage means [represented by block SM16 in FIG. 4] for containing genetic algorithm models.

At least one instruction in the set of instructions [represented by block SI16 in FIG. 4] for directing the said processing means [represented by block PM14 in FIG. 4] to collate data from storage means [represented by block SM34 in FIG. 4], polarize to eliminate noise and store the polarized data in a storage means [represented by block SM36 in FIG. 4];

At least one instruction in the said set of instructions [represented by block SI16 in FIG. 4] for directing the said processing means [represented by block PM22 in FIG. 4] to fetch the stored polarized data.

At least one instruction from the set of instructions [represented by block SI18 in FIG. 4] to instruct the transposing means [represented by block PM22 in FIG. 4] cooperating with the processing means [represented by block PM16 in FIG. 4] for the transposition of the fetched polarized data for the purpose of iteration of at least part of the said strategy in the said environment to generate a sequence of results and store sequence of results in a storage means [represented by block SM38 in FIG. 4].

At least one instruction in the said set of instructions [represented by block SI20 in FIG. 4] for directing the said processing means [represented by block PM14 in FIG. 4] to process the polarized data in accordance with the rules [represented by block SI22 in FIG. 4] of the said strategy for its sets of determined parameters for the said set of time series for the said time frame for the said discrete time interval for the said portfolio of investments in the environment to activate processing means [represented by block PM16 in FIG. 4] to generate a sequence of results and store sequence of results in a storage means [represented by block SM38 in FIG. 4].

A least one instruction in the said set of instructions [represented by block SI22 in FIG. 4] for directing the said processing means [represented by block PM16 in FIG. 4] to generate a set containing a plurality of said sequence of results obtaining by varying the sets of determined parameters for the said strategy for the said set of time series for the said time frame for the said discrete time interval for the said portfolio of investments in the said environment and store the set containing a plurality of sequence of results in a storage means [represented by block SM38 in FIG. 4].

At least one instruction in the said set of instructions [represented by block SI24 in FIG. 4] for directing the said processing means [represented by block PM18 in FIG. 4] to apply the said genetic algorithm model to the created and stored set containing the plurality of said sequences of results for creating at least one intermediate generation of partly or fully optimized returns on the said portfolio of investments and generating at least one set of determined parameters.

At least one instruction in set of transposing instructions [represented by block SI26 in FIG. 4] for instructing the said processing means [represented by block PM22 in FIG. 4] to generate a plurality of sequence of results.

A set of instructions [represented by block SI28 in FIG. 4] which instruct a multiple closed looped feedback means [represented by block PM24 in FIG. 4] to cooperate with the processing means [represented by block PM18 in FIG. 4] cooperating with storage means [represented by block SM40 in FIG. 4] for obtaining partly optimized intermediate values of multi-objective function.

At least one instruction in a set of convergence instructions [represented by block SI30 in FIG. 4] to instruct setting means [represented by block Set02 in FIG. 4] for setting of convergence criteria to define an end point for the multiple looping feedback means [represented by block PM24 in FIG. 4] and a comparator means [represented by block PM26 in FIG. 4] for comparing at least one property of feedback obtained from the multiple close looped feedback means [represented by block PM24 in FIG. 4] with a set defined value of the property as set in co-operation with the said setting means [represented by block Set02 in FIG. 4].

The processing means [represented by block PM02 to PM28 in FIG. 4] comprise a plurality of processing units co-operating with each other preferably in parallel mode.

The processing means [represented by block PM02 to PM28 in FIG. 4] can be remotely located and co-operate with each other via interfacing means [represented by block IM01 in FIG. 4].

The storage means [represented by block SM02 to SM40 in FIG. 4] can consist of a plurality of linked or remotely located elements co-operating with each other.

The pointing means [represented by block PtM02 to PtM08 in FIG. 4] can consist of at least one from the set of pointing means which includes a keyboard, mouse, digital pens, voice or touch actuated means, joystick, track balls.

The output means [represented by block OM02 to OM08 in FIG. 4] can consist of at least one from the set of output means consisting from the set of writing means such as a printer, display means such as a monitor or a video screen, transmission means or storage means.

The interface means [represented by block IM01 in FIG. 4] can consist of at least one from the set of interface means consisting of direct cabling, local area network and wide area network and advantageously the interface means is the internet and the said processing, storage, pointing and output means, communicate with each other jointly or severally via modems.

The database [represented by block DB02 in FIG. 4] can be a database linked to at least one exchange selected from a set of exchanges consisting of stock exchanges, derivatives exchanges, fixed income exchanges, monetary exchange, the database being static and dynamic.

The processing means [represented by block PM02 to PM28 in FIG. 4] which receive the said execution mode, strategy and its determined parameters, portfolio of investments, set of time series, environment and genetic algorithm model, the processing means which process the said execution mode, strategy and its determined parameters, portfolio of investments, set of time series, environment and genetic algorithm model and the processing means which create a sequence of specifications, can be the same.

The processing means [represented by block PM02 to PM28 in FIG. 4] which receive the said execution mode, strategy and its determined parameters, portfolio of investments, set of time series, environment and genetic algorithm model, the processing means which process the said execution mode, strategy and its determined parameters, portfolio of investments, set of time series, environment and genetic algorithm model and the processing means which create a sequence of specifications, can consist of a plurality of processing means co-operating with each other.

At least one of the processing means [represented by block PM02 to PM28 in FIG. 4] which receive the said execution mode, strategy and its determined parameters, portfolio of investments, set of time series, environment and genetic algorithm model, the processing means which process the said execution mode, strategy and its determined parameters, portfolio of investments, set of time series, environment and genetic algorithm model and the processing means which create a sequence of specifications, can be remotely located.

The collating means [represented by block CM in FIG. 4] can consist of inputting means [represented by block CM02 in figure 4] for receiving raw data from at least one data source, prefiltering means [represented by block CM04 in FIG. 4] for extracting data into an intermediately pre-filtered data and linking means [represented by block CM06 in FIG. 4] for linking the elements of the extracted data for the purposes of collation.

The polarizing means [represented by block PlM in FIG. 4] can include a noise elimination means [represented by block PlM02 in FIG. 4] co-operating with the collating means [represented by block CM in FIG. 4], which consists of filtering means [represented by block PlM10 in FIG. 4] for filtering spurious records, renaming means [represented by block PlM04 in FIG. 4] for organizing, adjustment means [represented by block PlM06 in FIG. 4] for adjusting time based volume and prices of the elements of extracted data, generating means [represented by block PlM08 in FIG. 4] for generating Open-High-Low-Close-Volume bars corresponding to the set of discrete time intervals to obtain polarized data.

The collating means [represented by block CM in FIG. 4] and the polarizing means [represented by block PlM in FIG. 4] are the same or can be remotely located.

The transposing means [represented by block PM22 in FIG. 4] can be a processing means co-operating with the storage means [represented by block SM02 in FIG. 4] having a stored set of transposing instructions for processing in accordance with the strategies.

The processing means [represented by block PM14 in FIG. 4] which process the polarized data in accordance with the rules of the said strategy for its sets of determined parameters for the said set of time series for the said time frame for the said discrete time interval for the said portfolio of investments in the environment to generate a sequence of results and the processing means [represented by block PM16 in FIG. 4] cooperating with the storage means [represented by block SM38 in FIG. 4] in which the sequence of results is stored, can be the same.

Alternatively, the processing means [represented by block PM14 in FIG. 4] which process the polarized data in accordance with the rules of the said strategy for its sets of determined parameters for the said set of time series for the said time frame for the said discrete time interval for the said portfolio of investments in the environment to generate a sequence of results and the processing means [represented by block PM16 in FIG. 4] cooperating with the storage means [represented by block SM38 in FIG. 4] in which the sequence of results is stored, can consist of a plurality of processing means co-operating with each other.

The processing means [represented by block PM14 in FIG. 4] which process the polarized data in accordance with the rules of the said strategy for its sets of determined parameters for the said set of time series for the said time frame for the said discrete time interval for the said portfolio of investments in the environment to generate a sequence of results and the processing means [represented by block PM16 in FIG. 4] cooperating with the storage means [represented by block SM38 in FIG. 4] in which the sequence of results is stored, in which one of the processing means can be remotely located.

The processing means [represented by block PM16 in FIG. 4] which generate a set containing a plurality of said sequence of results obtaining by varying the sets of determined parameters for the said strategy for the said set of time series for the said time frame for the said discrete time interval for the said portfolio of investments in the said environment and the processing means [represented by block PM30 in FIG. 4] cooperating with the storage means [represented by block SM38 in FIG. 4] in which the set containing a plurality of sequence of results is stored, in accordance with one aspect of this invention can be the same.

Alternatively, the processing means [represented by block PM16 in FIG. 4] which generate a set containing a plurality of said sequence of results obtaining by varying the sets of determined parameters for the said strategy for the said set of time series for the said time frame for the said discrete time interval for the said portfolio of investments in the said environment and the processing means [represented by block PM30 in FIG. 4] cooperating with the storage means [represented by block SM38 in FIG. 4] in which the set containing a plurality of sequence of results is stored, can consist of a plurality of processing means co-operating with each other.

The processing means [represented by block PM16 in FIG. 4] which generate a set containing a plurality of said sequence of results obtaining by varying the sets of determined parameters for the said strategy for the said set of time series for the said time frame for the said discrete time interval for the said portfolio of investments in the said environment and the processing means [represented by block PM30 in FIG. 4] cooperating with the storage means [represented by block SM38 in FIG. 4] in which the set containing a plurality of sequence of results is stored, in which at least one of the processing means may be remotely located.

The processing means [represented by block PM18 in FIG. 4] which create at least one intermediate generation of partly or fully optimized returns of the said portfolio of investments and the processing means [represented by block PM20 in FIG. 4] which generate at least one set of determined parameters, can be the same.

Alternatively, the processing means [represented by block PM18 in FIG. 4] which create at least one intermediate generation of partly or fully optimized returns on the said portfolio of investments and the processing means [represented by block PM20 in FIG. 4] which generate at least one set of determined parameters, consists of a plurality of processing means co-operating with each other.

Particularly, the processing means [represented by block PM18 in FIG. 4] which create at least one intermediate generation of partly or fully optimized returns on the said portfolio of investments and the processing means [represented by block PM20 in FIG. 4] which generate at least one set of determined parameters, in which at least one of the processing means can be remotely located.

The multiple close loop feedback means [represented by block PM24 in FIG. 4] can be a processing means having a stored set of multiple close loop feedback instructions [represented by block SI28 in FIG. 4] for obtaining partly optimized intermediate values of multi-objective function.

A storage means [represented by block SM18 in FIG. 4] is provided to store the set of convergence criteria co-operating with comparator means [represented by block PM26 in FIG. 4] and multiple close loop feedback means [represented by block PM24 in FIG. 4].

The storage means [represented by block SM02 in FIG. 4] in which the various sets of instructions are stored, the storage means [represented by block SM04 in FIG. 4] in which the said set of strategies is stored, the storage means [represented by block SM06 in FIG. 4] in which the said selected strategy is stored, the storage means [represented by block SM08 in FIG. 4] in which the said portfolios of investments, the storage means [represented by block SM10 in FIG. 4] in which the said selected portfolio of investments, the storage means [represented by block SM12 in FIG. 4] in which the said sets of time series, the storage means [represented by block SM14 in FIG. 4] in which the said selected set of time series, the storage means [represented by block SM16 in FIG. 4] in which the said genetic algorithm models, the storage means [represented by block SM18 in FIG. 4] in which the said selected genetic algorithm model is stored, the storage means [represented by block SM20 in FIG. 4] in which the said selected execution mode is stored, the storage means [represented by block SM22 in FIG. 4] in which the said selected time frame is stored, the storage means [represented by block SM24 in FIG. 4] in which the said selected discrete time interval is stored, the storage means [represented by block SM26 in FIG. 4] in which the said selected time mode is stored, the storage means [represented by block SM28 in FIG. 4] in which the said parameters is stored, the storage means [represented by block SM30 in FIG. 4] in which the said determined parameters are stored, the storage means [represented by block SM32 in FIG. 4] in which the created sequence of specifications are stored, the storage means [represented by block SM38 in FIG. 4] in which the said intermediate plurality of sequence of results are stored, the storage means [represented by block SM40 in FIG. 4] in which the said created partly intermediate values of multi-objective function are stored, can be the same.

Alternatively, at least one amongst, the storage means [represented by block SM02 in FIG. 4] in which the various sets of instructions are stored, the storage means [represented by block SM04 in FIG. 4] in which the said set of strategies is stored, the storage means [represented by block SM06 in FIG. 4] in which the said selected strategy is stored, the storage means [represented by block SM08 in FIG. 4] in which the said portfolios of investments, the storage means [represented by block SM10 in FIG. 4] in which the said selected portfolio of investments, the storage means [represented by block SM12 in FIG. 4] in which the said sets of time series, the storage means [represented by block SM14 in FIG. 4] in which the said selected set of time series, the storage means [represented by block SM16 in FIG. 4] in which the said genetic algorithm models, the storage means [represented by block SM18 in FIG. 4] in which the said selected genetic algorithm model is stored, the storage means [represented by block SM20 in FIG. 4] in which the said selected execution mode is stored, the storage means [represented by block SM22 in FIG. 4] in which the said selected time frame is stored, the storage means [represented by block SM24 in FIG. 4] in which the said selected discrete time interval is stored, the storage means [represented by block SM26 in FIG. 4] in which the said selected time mode is stored, the storage means [represented by block SM28 in FIG. 4] in which the said parameters is stored, the storage means [represented by block SM30 in FIG. 4] in which the said determined parameters are stored, the storage means [represented by block SM32 in FIG. 4] in which the created sequence of specifications are stored, the storage means [represented by block SM38 in FIG. 4] in which the said intermediate plurality of sequence of results are stored, the storage means [represented by block SM40 in FIG. 4] in which the said created partly intermediate values of multi-objective function are stored, may be remotely located.

Still further, at least one of the storage means [represented by block SM02 in FIG. 4] in which the various sets of instructions are stored, the storage means [represented by block SM04 in FIG. 4] in which the said set of strategies is stored, the storage means [represented by block SM06 in FIG. 4] in which the said selected strategy is stored, the storage means [represented by block SM08 in FIG. 4] in which the said portfolios of investments, the storage means [represented by block SM10 in FIG. 4] in which the said selected portfolio of investments, the storage means [represented by block SM12 in FIG. 4] in which the said sets of time series, the storage means [represented by block SM14 in FIG. 4] in which the said selected set of time series, the storage means [represented by block SM16 in FIG. 4] in which the said genetic algorithm models, the storage means [represented by block SM18 in FIG. 4] in which the said selected genetic algorithm model is stored, the storage means [represented by block SM20 in FIG. 4] in which the said selected execution mode is stored, the storage means [represented by block SM22 in FIG. 4] in which the said selected time frame is stored, the storage means [represented by block SM24 in FIG. 4] in which the said selected discrete time interval is stored, the storage means [represented by block SM26 in FIG. 4] in which the said selected time mode is stored, the storage means [represented by block SM28 in FIG. 4] in which the said parameters is stored, the storage means [represented by block SM30 in FIG. 4] in which the said determined parameters are stored, the storage means [represented by block SM32 in FIG. 4] in which the created sequence of specifications are stored, the storage means [represented by block SM38 in FIG. 4] in which the said intermediate plurality of sequence of results are stored, the storage means [represented by block SM40 in FIG. 4] in which the said created partly intermediate values of multi-objective function are stored, can be temporary.

At least one amongst The storage means [represented by block SM02 in FIG. 4] in which the various sets of instructions are stored, the storage means [represented by block SM04 in FIG. 4] in which the said set of strategies is stored, the storage means [represented by block SM06 in FIG. 4] in which the said selected strategy is stored, the storage means [represented by block SM08 in FIG. 4] in which the said portfolios of investments, the storage means [represented by block SM10 in FIG. 4] in which the said selected portfolio of investments, the storage means [represented by block SM12 in FIG. 4] in which the said sets of time series, the storage means [represented by block SM14 in FIG. 4] in which the said selected set of time series, the storage means [represented by block SM16 in FIG. 4] in which the said genetic algorithm models, the storage means [represented by block SM18 in FIG. 4] in which the said selected genetic algorithm model is stored, the storage means [represented by block SM20 in FIG. 4] in which the said selected execution mode is stored, the storage means [represented by block SM22 in FIG. 4] in which the said selected time frame is stored, the storage means [represented by block SM24 in FIG. 4] in which the said selected discrete time interval is stored, the storage means [represented by block SM26 in FIG. 4] in which the said selected time mode is stored, the storage means [represented by block SM28 in FIG. 4] in which the said parameters is stored, the storage means [represented by block SM30 in FIG. 4] in which the said determined parameters are stored, the storage means [represented by block SM32 in FIG. 4] in which the created sequence of specifications are stored, the storage means [represented by block SM38 in FIG. 4] in which the said intermediate plurality of sequence of results are stored, the storage means [represented by block SM40 in FIG. 4] in which the said created partly intermediate values of multi-objective function are stored, is linked to the database containing information about the investments traded in the exchanges.

The comparator means [represented by block PM26 in FIG. 4] can be a processing means having a stored set of convergence instructions [represented by block SI30 in FIG. 4] for comparing the intermediate values of a multi-objective function with the set convergence criteria.

EXAMPLES

The invention will now be described with reference to the accompanying examples, which are given merely for the purpose of illustration and should not in any manner limit the nature and scope of the invention.

Example 1

Simple Moving Average—Return Maximization

1. A Simple Moving Average (SMA) based strategy was selected from the store of pre-determined strategies. The available strategies were strategies like Relative Strength Index (RSI) based strategy, Average Directional Index (ADX) strategy, and Modified Exponential Moving Average (MEMA) based strategy.
2. Selecting stocks CASTROL and GLAXO belonging to the National Stock Exchange located in India created a portfolio. The timings of the exchange were 10:00 A.M and 3:30 P.M. and trading was done in a single session.
3. The position of CASTROL was initialized to 10 units.
4. The returns on CASTROL were initialized to INR (Indian Rupees) 1000.
5. The position of GLAXO was initialized to 0 units.
6. The returns on GLAXO were initialized to INR (Indian Rupees) 0.
7. A CASTROL stock traded in NSE was selected to create a time series with expression '(H+L)/2' which returned the mid-point of high price and low price. The discrete time interval was set to HOUR. Hence the bars were formed for every hour.

8. A GLAXO stock traded in NSE was selected to create a time series with expression '(H+L)/2' which returned the mid-point of high price and low price. The discrete time interval was set to DAILY. Hence the bars were formed for each day.
9. From the set of time series the minimum discrete time interval was calculated which was HOUR. The minimum discrete time interval was set to HOUR.
10. Data for CASTROL was available from "02, Jan. 1994" and "30, Sep. 1999". In case of GLAXO data was available from "02, Jan. 1995" and "30, Sep. 1999". So the intersection of time interval was found to be "02, Jan. 1995" and "30, Sep. 1999". This was the duration for which data for both the investments was available. Duration of "23, Feb. 1995" and "01, Jul. 1995" was selected as a time frame for carrying out optimization.
11. The investments CASTROL and GLAXO belong to the same exchange National Stock Exchange. As these do not lie in different time zones, the time mode chosen was Indian Standard Time (IST).
12. The number of past bars to be considered for calculating the arithmetic mean was determined as a parameter to be optimized. This was the parameter that was used for averaging the past bars. The master individual was composed of the lower bound 80, the upper bound 180 and the step value 1. The generations of individuals used this master individual to generate individuals in the population of each generation by randomizing and determining new values of number of past bars within the upper bound and lower bound.
13. The selection means based on Roulette Wheel method was adopted for carrying out selection in the genetic algorithm model. In this method of selection the fitter individuals have more chances of being selected.
14. Single Point Crossover means was adopted for carrying out crossover in the genetic algorithm model. The crossover probability specified was 0.95.
15. Simple Mutation means was adopted for carrying out crossover in the genetic algorithm model. The mutation probability specified was 0.35.
16. The fitness criterion was profit. The individuals with the higher profits were considered to be more fit than their counterparts.
17. The population size was specified as 4. Each population was therefore composed of 4 individuals.
18. As the convergence criterion the rules of the strategy SMA were applied over each individual in the population till the number of generations formed equaled the specified number say 8.
19. The apparatus was set to perform 5 parallel executions. At any point in time there was parallel execution for 5 different parameter values.
20. A new individual was created using the parameter and the information given in the master individual in the following manner. The lower bound and upper bound values were given as 80 and 180 respectively. The range, which the parameter values spanned, was calculated as 100 that was the difference between the upper bound and the lower bound. The maximum string size required to store the range in binary form was calculated to be 7. A random number lying within the range was generated say 86. This number represented the offset from the lower bound, so the value of the parameter represented by this number was 80+86 i.e. 166. The individual was added to the population. The string representation of this generated number was used for crossover and mutation. The population comprising of 4 individuals was created in the above manner.
21. Parent population in first generation
    1010110 It corresponded to a value of 86. So the value of the parameter was 166 i.e. 80+86.
    0100100 It corresponded to a value of 36. So the value of the parameter was 116 i.e. 80+36.
    0000010 It corresponded to a value of 2. So the value of the parameter was 82 i.e. 80+2.
    0011010 It corresponded to a value of 26. So the value of the parameter was 106 i.e. 80+26.
22. The parameters were obtained by decoding the bit string representation. The polarized data for the selected portfolio and time series was fetched. The time stamps of each time series in the set of time series and each investment in the portfolio were aligned.
23. The rules of SMA strategy were then applied to the portfolio of investment.
24. The returns i.e. the profit values were then calculated for the investment.
25. The results as well as the parameters over which the rules of the strategy had been applied were then stored within the individual.
26. The fitness for that individual was calculated by summing profit values of each investment in the portfolio.
27. The time stamps of each time series in the set of time series and each investment in the portfolio were set to the next valid time session for that particular exchange.
28. The strategy was then executed for each individual in the population for the specified time duration.
29. To create the next generation, two individuals were selected from the parent population using the specified selection method, say the second and fourth individuals of the population. Bit strings 0100100 and 0011010 represented these individuals respectively.
30. Crossover of the selected individuals was performed at a randomly generated locus point depending on the crossover probability to create two different individuals. The individuals were then validated to determine if the bit string formed after crossover produced individuals whose parameter values lay within the range specified in the master individual.
    a. After crossover at locus point 4, 0010100 represented the resulting individual, which corresponded to parameter of 100.
    b. After crossover at locus point 4, 0101010 represented the resulting individual, which corresponded to parameter of 122.
31. Mutation of a selected individual was performed at a randomly generated locus point depending on the mutation probability to create a new individual. The individual was validated to determine if the bit string formed after mutation produced an individual whose parameter values lay within the range specified in the master individual.
32. On mutating individual represented by 0101010 at locus point 7, 0101011 represented the resulting individual, which corresponded to parameter value 123, which was a valid parameter. Individuals represented by bit string 0010100 and 0101011 formed after crossover and mutations were added to the offspring population. After further crossover and mutation the individuals comprising the offspring population were
    0010100 It corresponded to a value of 20. So the value of the parameter was 100 i.e. 80+20.
    0101011 It corresponded to a value of 43. So the value of the parameter was 123 i.e. 80+43.
    0100100 It corresponded to a value of 36. So the value of the parameter was 116 i.e. 80+36.

0100100 It corresponded to a value of 36. So the value of the parameter was 116 i.e. 80+36.

33. The parent population size was not odd hence no deletions were made from offspring population and the parent population was replaced with offspring population to form the new parent generation to start the next generation.
34. The steps were repeated till convergence criterion was satisfied i.e. the required numbers of generations were formed.

Example 2

Relative Strength Index—Return Maximization

1. A Relative Strength Index (RSI) based strategy was selected from the store of pre-determined strategies. The available strategies were strategies like Simple Moving Average (SMA) based strategy, Average Directional Index (ADX) strategy, and Modified Exponential Moving Average (MEMA) based strategy
2. Selecting stocks CASTROL, and GLAXO belonging to the National Stock Exchange located in India created a portfolio. The timings of the exchange were 10:00 A.M and 3:30 P.M. and trading was done in a single session.
3. The position of CASTROL was initialized to 10 units.
4. The returns on CASTROL were initialized to INR (Indian Rupees) 1000.
5. The position of GLAXO was initialized to 0 units.
6. The returns on GLAXO were initialized to INR (Indian Rupees) 0.
7. A CASTROL stock traded in NSE was selected to create a time series with expression '(H+L)/2' which returned the mid-point of high price and low price. The discrete time interval was set to HOUR. Hence the bars were formed for every hour.
8. A GLAXO stock traded in NSE was selected to create a time series with expression '(H+L)/2' which returned the mid-point of high price and low price. The discrete time interval was set to DAILY. Hence the bars were formed for each day.
9. From the set of time series the minimum discrete time interval was calculated which was HOUR. The minimum discrete time interval was set to HOUR.
10. Data for CASTROL was available from "02, Jan. 1994" and "30, Sep. 1999". In case of GLAXO data was available from "02, Jan. 1995" and "30, Sep. 1999". So the intersection of time interval was found to be "02, Jan. 1995" and "30, Sep. 1999". This was the duration for which data for both the investments was available. Duration of "23, Feb. 1995" and "01, Jul. 1995" was selected as a time frame for carrying out optimization.
11. The investments CASTROL and GLAXO belong to the same exchange National Stock Exchange. As these do not lie in different time zones, the time mode chosen was Indian Standard Time (IST).
12. The number of past bars, the lower cutoff and the higher cutoff were determined as the set of parameters to be optimized. The master individual was composed of the lower bound, the upper bound and the step value for all three parameters. The generations of individuals used this master individual to generate individuals in the population of each generation by randomizing and determining new values of parameters within the upper bound and lower bound.
13. The selection means based on Roulette Wheel method was adopted for carrying out selection in the genetic algorithm model. In this method of selection the fitter individuals have more chances of being selected.
14. Single Point Crossover means was adopted for carrying out crossover in the genetic algorithm model. The crossover probability specified was 0.95.
15. Simple Mutation means was adopted for carrying out crossover in the genetic algorithm model. The mutation probability specified was 0.35.
16. The fitness criterion was profit. The individuals with the higher profits were considered to be more fit than their counterparts.
17. The population size was specified as 4. Each population was therefore composed of 4 individuals.
18. As the convergence criterion the rules of the strategy RSI were applied over each individual in the population till the number of generations formed equaled the specified number say 8.
19. The apparatus was set to perform 5 parallel executions. At any point in time there was parallel execution for 5 different sets of parameters.
20. A new individual was created using the information given in the master individual in the following manner.

Parameter 1: Lower Bound=3 and Upper Bound=4. The range, which the parameter values spanned, was 1 that was the difference between the upper bound and the lower bound. The maximum string size required to store the range in binary form was calculated to be 1.

Parameter 2: Lower Bound=10 and Upper Bound=20. The range, which the parameter values spanned, was 10 that was the difference between the upper bound and the lower bound. The maximum string size required to store the range in binary form was calculated to be 4.

Parameter 3: Lower Bound=50 and Upper Bound=60. The range, which the parameter values spanned, was 10 that was the difference between the upper bound and the lower bound. The maximum string size required to store the range in binary form was calculated to be 4.

The maximum string size required to store the parameter information in the individual was obtained as the sum of the maximum string sizes required to store the range of each parameter i.e. 9.

A random number lying between the lower bound and upper bound of each parameter was generated. This number represented the offset from the lower bound. The string representations of the randomly generated number corresponding to each parameter were then concatenated to generate the string representation of the master individual. The string representation of the generated individual was used for crossover and mutation.

For the first parameter the lower bound was 3 and upper bound was 4. The random number generated between 0 and 1 inclusive was 1. So the value of the parameter corresponding to past number of bars was 3+1 i.e. 4.

For the second parameter the lower bound was 10 and upper bound was 20. The random number generated between 0 and 10 inclusive was 4. So the value of the parameter corresponding to lower cutoff was 10+4 i.e. 14.

For the third parameter the lower bound was 50 and upper bound was 60. The random number generated between 0 and 10 inclusive was 2. So the value of the parameter corresponding to the higher cutoff was 50+2 i.e. 52. The string representation of master individual="101000010"="1"+"0100"+"0010" The individual was added to the population. The population comprising of 4 individuals was created in the above manner.

21. The parameters were obtained by decoding the bit string representation. The polarized data for the selected portfolio and time series was fetched. The time stamps of each time series in the set of time series and each investment in the portfolio were aligned.

22. The rules of RSI strategy were then applied to the portfolio of investment.
23. The returns i.e. the profit values were then calculated for the investment.
24. The results as well as the parameters over which the rules of the strategy had been applied were stored within the individual.
25. The fitness for that that individual was calculated by summing profit values of each investment in the portfolio.
26. The time stamps of each time series in the set of time series and each investment in the portfolio were set to the next valid time session for that particular exchange.
27. The strategy was then executed for each individual in the population for the specified time duration.
28. To create the next generation, two individuals were selected from the parent population using the selection method.
29. Crossover of the selected individuals was performed at a randomly generated locus point depending on the crossover probability to create two different individuals. The individuals were then validated to determine if the bit string formed after crossover produced individuals whose parameter values lay within the range specified in the master individual.
30. Mutation of a selected individual was performed at a randomly generated locus point depending on the mutation probability to create a new individual. The individual was then validated to determine if the bit string formed after mutation produced an individual whose parameter values lay within the range specified in the master individual.
31. The parent population size was not odd hence no deletions were made from offspring population and the parent population was. replaced with offspring population to form the new parent generation to start the next generation.
32. The steps were repeated till convergence criterion was satisfied i.e. the required numbers of generations were formed.

Example 3

Simple Moving Average—Risk Minimization

1. A Simple Moving Average (SMA) based strategy was selected from the store of pre-determined strategies. The available strategies were strategies like Relative Strength Index (RSI) based strategy, Average Directional Index (ADX) strategy, and Modified Exponential Moving Average (MEMA) based strategy.
2. Selecting stocks CASTROL and GLAXO belonging to the National Stock Exchange located in India created a portfolio. The timings of the exchange were 10:00 A.M and 3:30 P.M. and trading was done in a single session.
3. The position of CASTROL was initialized to 10 units.
4. The returns on CASTROL were initialized to INR (Indian Rupees) 1000.
5. The position of GLAXO was initialized to 0 units.
6. The returns on GLAXO were initialized to INR (Indian Rupees) 0.
7. A CASTROL stock traded in NSE was selected to create a time series with expression '(H+L)/2' which returned the mid-point of high price and low price. The discrete time interval was set to HOUR. Hence the bars were formed for every hour.
8. A GLAXO stock traded in NSE was selected to create a time series with expression '(H+L)/2' which returned the mid-point of high price and low price. The discrete time interval was set to DAILY. Hence the bars were formed for each day.
9. From the set of time series the minimum discrete time interval was calculated which was HOUR. The minimum discrete time interval was set to HOUR.
10. Data for CASTROL was available from "02, Jan. 1994" and "30, Sep. 1999". In case of GLAXO data was available from "02, Jan. 1995" and "30Sep. 1999". So the intersection of time interval was found to be "02, Jan. 1995" and "30, Sep. 1999". This was the duration for which data for both the investments was available. Duration of "23, Feb. 1995" and "01, Jul. 1995" was selected as a time frame for carrying out optimization.
11. The investments CASTROL and GLAXO belong to the same exchange National Stock Exchange. As these do not lie in different time zones, the time mode chosen was Indian Standard Time (IST).
12. The number of past bars to be considered for calculating the arithmetic mean was determined as a parameter to be optimized. This was the parameter that was used for averaging the past bars. The master individual was composed of the lower bound 80, the upper bound 180 and the step value 1. The generations of individuals used this master individual to generate individuals in the population of each generation by randomizing and determining new values of number of past bars within the upper bound and lower bound.
13. The selection means based on Roulette Wheel method was adopted for carrying out selection in the genetic algorithm model. In this method of selection the fitter individuals have more chances of being selected.
14. Single Point Crossover means was adopted for carrying out crossover in the genetic algorithm model. The crossover probability specified was 0.95.
15. Simple Mutation means was adopted for carrying out crossover in the genetic algorithm model. The mutation probability specified was 0.35.
16. The fitness criterion was maximum drawdown. The individuals with the lower maximum drawdown values were considered to be more fit than their counterparts.
17. The population size was specified as 4. Each population was therefore composed of 4 individuals.
18. As the convergence criterion the rules of the strategy SMA were applied over each individual in the population till the number of generations formed equaled the specified number say 8.
19. The apparatus was set to perform 5 parallel executions. At any point in time there was parallel execution for 5 different parameters.
20. A new individual was created using the parameter and the information given in the master individual in the following manner. The lower bound and upper bound values were given as 80 and 180 respectively. The range over which the parameter values spanned was calculated as 100, which was the difference between the upper bound and the lower bound. The maximum string size required to store the range in binary form was calculated to be 7. A random number lying within the range was generated say 51. This number represented the offset from the lower bound, so the value of the parameter represented by this number was 80+51 i.e. 131. The individual was added to the population. The string representation of this generated number was used for crossover and mutation. The population comprising of 4 individuals was created in the above manner.

21. Parent population in first generation
    0110011 It corresponded to a value of 51. So the value of the parameter was 131 i.e. 80+51.
    0110010 It corresponded to a value of 50. So the value of the parameter was 130 i.e. 80+50.
    0010000 It corresponded to a value of 16. So the value of the parameter was 96 i.e. 80+16.
    1011011 It corresponded to a value of 91. So the value of the parameter was 171 i.e. 80+91.
22. The parameters were obtained by decoding the bit string representation. The polarized data for the selected portfolio and time series was fetched. The time stamps of each time series in the set of time series and each investment in the portfolio were aligned.
23. The rules of SMA strategy were then applied to the portfolio of investment.
24. The maximum drawdown values were then calculated for the investment.
25. The results as well as the parameters over which the rules of the strategy had been applied were then stored within the individual.
26. The fitness for that that individual was calculated by summing the maximum drawdown values of each investment in the portfolio.
27. The time stamps of each time series in the set of time series and each investment in the portfolio were set to the next valid time session for that particular exchange.
28. The strategy was then executed for each individual in the population for the specified time duration.
29. To create the next generation, two individuals were selected from the parent population using the specified selection method.
30. Crossover of the selected individuals was performed at a randomly generated locus point depending on the crossover probability to create two different individuals. The individuals were then validated to determine if the bit string formed after crossover produced individuals whose parameter values lay within the range specified in the master individual.
31. Mutation of a selected individual was performed at a randomly generated locus point depending on the mutation probability to create a new individual. The individual was validated to determine if the bit string formed after mutation produced an individual whose parameter values lay within the range specified in the master individual. After crossover and mutation the individuals comprising the offspring population were
    0010000 It corresponded to a value of 16. So the value of the parameter was 96 i.e. 80+16.
    0000000 It corresponded to a value of 0. So the value of the parameter was 80 i.e. 80+0.
    0010000 It corresponded to a value of 16. So the value of the parameter was 96 i.e. 80+16.
    0010000 It corresponded to a value of 16. So the value of the parameter was 96 i.e. 80+16.
32. The parent population size was not odd hence no deletions were made from offspring population and the parent population was replaced with offspring population to form the new parent generation to start the next generation.
33. The steps were repeated till convergence criterion was satisfied i.e. the required numbers of generations were formed.

One embodiment of this invention also assists in timely detection of market irregularities. In the process of optimizing a multi-objective function of a portfolio of investments, one of the strategy adopted could be tracking of price change of investment with its volume. An abnormal deviation in price for a given volume or an abnormal deviation in volume for a given price can be set as one of the determined parameter and method can be used to elicit irregularity by the process of flagging.

While considerable emphasis has been placed herein on the structures and structural interrelationships between the component parts of the preferred embodiments, and the various steps of the method it will be appreciated that many embodiments can be made and that many changes can be made in the preferred embodiments without departing from the principals of the invention. These and other changes in the preferred embodiment as well as other embodiments of the invention will be apparent to those skilled in the art from the disclosure herein, whereby it is to be distinctly understood that the foregoing descriptive matter is to be interpreted merely as illustrative of the invention and not as a limitation.

What is claimed is:

1. A method for strategy independent optimization of a multi-objective function of a portfolio containing at least one investment comprising the steps of:
   determining and if required setting the execution mode;
   selecting a strategy defined by a set of rules from a set of strategies containing at least one strategy;
   identifying a portfolio of investments, consisting of at least one investment, whose multi-objective function has to be optimized;
   identifying a set containing a plurality of time series in relation to investment including at least one time series;
   defining an environment including a time frame in which the multi-objective function has to be optimized, a discrete time interval and mode in accordance with standard time;
   determining a set of parameters of the selected strategy amenable for optimizing;
   creating a genetic algorithm model which includes its convergence;
   creating a sequence of specifications for the determined set of parameters of the selected strategy in the context of the said environment for the said genetic algorithm model for the said portfolio of investments for the said set of time series;
   storing the created sequence of specifications in the memory of a first set of processing units containing at least one processing unit;
   collating raw data relating to the said portfolio of investments, the set of time series, and the information about the said environment;
   polarizing the collated data if required by eliminating noise and storing the polarized data in the memory of a second set of processing units containing at least one processing unit;
   fetching the polarized data from its stored location and transposing it for the purpose of iteration using the said strategy in the said environment;
   processing the polarized data in accordance with the rules of the said strategy for its sets of determined parameters for the said set of time series for the said time frame for the said discrete time interval for the said portfolio of investments in the said environment to generate a sequence of results;
   storing the said sequence of results in the memory of a third set of processing units containing at least one processing unit; generating a set containing a plurality of said sequence of results obtained by varying the sets of determined parameters for the said strategy for the said set of time series for the said time frame for the said discrete time interval for the said portfolio of investments in the said environment;

storing, in the memory of a fourth set of processing units containing at least one processing unit the said set containing a plurality of said sequence of results;

applying the said genetic algorithm model to the created and stored set containing the plurality of said sequences of results to create at least one intermediate generation of optimized multi-objective function of the said portfolio of investments;

determining whether a selected characteristic of the intermediate generation is not satisfied in relation to the said convergence criteria and there after creating a new set of determined parameters; and repeating the steps of the method commencing from generating a set containing a plurality of said sequence of results obtained by utilizing the new set of determined parameters and ending with applying the genetic algorithm model to obtain a new generation of optimized multi-objective function of the said portfolio of investments until the convergence criteria is satisfied to obtain a fully optimized multi-objective function of the said portfolio of investments;

wherein the step of polarizing includes a step of noise elimination co-operating with a step of collating which includes steps of filtering spurious records, renaming, organizing, adjusting time based volume and prices of the elements of extracted data, and generating Open-High-Low-Close-Volume bars corresponding to the set of discrete time intervals to obtain polarized data; and further including a step of transposing polarized data, including a step of processing co-operating with a step of storing instructions for processing in accordance with the strategies.

2. The method of claim 1, in which the step of setting the execution mode includes the step of setting said execution mode in parallel.

3. The method of claim 1, in which the step of identifying a portfolio of investments includes the steps of selecting a portfolio of investments from a universe of investments, selecting at least one investment and information related thereto such as its price and duration as stored in a database of a selected exchange thereby creating a set of durations corresponding to the selected investments in the selected exchange wherein each element in said set of durations has a start time and an end time.

4. The method of claim 1, in which the step of identifying a portfolio of investments includes the step of selecting a portfolio of investments from a pre-determined stored set of portfolios of investments with or without modifications of an investment in the selected portfolio.

5. The method of claim 1, in which the step of identifying a set of time series includes the step of creating a set of time series associated with investment information related thereto as stored in the database of an selected exchange, along with other attributes including discrete time interval and expression, thereby creating a set of durations corresponding to the selected time series in the selected exchange wherein each element in the said set of durations has a start time and an end time.

6. The method of claim 1, in which the step of defining the environment includes steps of defining a time frame, a discrete time interval and a mode in accordance with standard time.

7. The method of claim 1, in which the step of defining the environment includes the step of obtaining a minimum value of the discrete time interval from the set of discrete time intervals of the said time series.

8. The method of claim 1, in which the step of defining the environment includes the step of obtaining an intersection of the said set of durations of time intervals corresponding to the set of time series with the said set of durations of time intervals corresponding to the investments in the portfolio.

9. The method of claim 1, in which the step of determining a set of parameters includes the step of identifying a correlation of the various parameters of the strategy.

10. The method of claim 1, in which the step of creating a genetic algorithm model includes the steps of specifying a method of calculating fitness, specifying a method of ranking, selecting a crossover probability, specifying a method for crossover, selecting a mutation probability, specifying a method for mutation, selecting a convergence criteria and specifying a population size to obtain a genetic algorithm model.

11. The method of claim 1, in which the step of creating the sequence of specifications includes the steps of collating information relating to the said strategy, collating information relating to the said environment, collating information relating to the said portfolio of investments, collating information relating to said set of time series, collating information relating to said genetic algorithm model, then sequentially listing classes and objects, creating linkages between the sequentially listed objects and classes and invoking methods of these sequentially listed objects and classes and the number of processing units to be deployed for execution selected from said sets of processing units to create said sequence of specifications.

12. The method of claim 1, in which the step of collating the raw data includes the steps of receiving the raw data from at least one data source, pre-filtering the received data into an intermediately pre-filtered data storage means and linking the elements of the filtered data for the purpose of collation.

13. The method of claim 1, in which the step of processing the polarized data includes the steps of selecting processing units from said sets of processing units on which execution is required to take place, iteratively applying rules of said strategy for said set of determined parameters; calculating a sequence of results; incrementing time using said discrete time interval and adjusting for said mutually exclusive sets of discrete session timings for an entire time frame.

14. The method of claim 1, in which the step of generating the set includes the step of applying at least a part of the genetic algorithm model to the set of determined parameters to create a population of sets of determined parameters.

15. The method of claim 1, in which the step of applying the genetic algorithm model includes the steps of selecting the processing units from said sets of processing units on which execution is required to take place, calculating a fitness of each individual of the population of the sets of determined parameters using a selected fitness function; ranking the individuals using a selected method of ranking; creating an offspring population of individuals of said population size by applying selected crossover method with said crossover probability and selected mutation method with the said mutation probability to create an offspring population of individuals of the determined set of parameters.

16. The method of claim 1, in which the step of applying the genetic algorithm model includes the step of applying the convergence criteria to the individuals of the generated offspring to verify that desired optimization is achieved.

17. An apparatus for carrying out a method for strategy independent optimization of multi-objective function of a portfolio containing at least one investment comprising, combination:

- at least one processing means for receiving data and instructions and using the instructions to process the data and generate at least one result;
- at least one storage means in communication with the said processing means for storing data, instructions, intermediate results, final results in discrete registers and pages adapted to co-operate with each other;
- at least one pointing means in communication with the said processing means and the said storage means adapted to inputting data and instructions into the said processing means and the said storage means;
- at least one output means for receiving intermediate and final results from the processing means; at least one interface means enabling the said processing, storage, pointing and output means, to communicate with each other jointly or severally;
- at least one set of instructions for utilizing the said processing, storage, pointing, output and interface means to carry out the method;
- at least one register or page in the said storage means for storing the instructions relating to the mode of execution of the processing means;
- at least one page in the storage means for containing a set of strategies containing at least one strategy and defined rules of the set;
- at least one pointing means in conjunction with the said processing means instructed by the said set of instructions adapted to select a strategy from the said set of stored strategies;
- at least one database containing information relating to investments;
- at least one page in the said storage means for containing at least one portfolio of investments, each portfolio containing at least one investment;
- at least one pointing-means in conjunction with the said processing means instructed by the said set of instructions adapted to select a portfolio from the stored portfolios of investments for optimizing the multi-objective function;
- at least one page in the said storage means for containing a set of time series each of the set containing at least one time series;
- at least one pointing means in conjunction with the said processing means instructed by the said set of instructions adapted to select a set of time series from the said stored sets of time series;
- at least one instruction in the said set of instructions for directing the said processing means to define an environment;
- at least one instruction in the said set of instructions for directing the processing means to determine an optimization of amenable parameters for obtaining a set of determined parameters of the selected strategy;
- at least one page in the said storage means for containing a set of means for calculating fitness containing at least one means for calculating fitness, a set of means for ranking containing at least one means for ranking, a set of means for performing crossover containing at least one means for performing crossover and a set of means for performing mutation containing at least one means for performing mutation;
- at least one pointing means in conjunction with the said processing means instructed by the said set of instructions adapted to select a means for calculating fitness, a means for ranking, a means for crossover and a means for mutation to create a genetic algorithm model;
- at least one instruction in the said set of instructions for directing the said processing means to receive the said execution mode, strategy and its determined parameters, portfolio of investments, time series, environment and genetic algorithm model and for processing them to create a sequence of specifications and at least one page in a storage means for storing the created sequence of specifications;
- at least one page in the said storage means for containing the raw data relating to the said portfolio of investments, the said set of time series, and the information about the environment;
- at least one instruction in the said set of instructions for directing the said processing means to collate, polarize to eliminate noise and store the polarized data in a storage means;
- at least one instruction in the said set of instructions for directing the said processing means to fetch the stored polarized data;
- transposing means cooperating with the processing means for the transposition of the fetched polarized data for the purpose of iteration of at least part of the said strategy in the said environment;
- at least one instruction in the said set of instructions for directing the said processing means to process the polarized data in accordance with the rules of the said strategy for its sets of determined parameters for the said set of time series for the said time frame for the said discrete time interval for the said portfolio of investments in the environment to generate a sequence of results and store sequence of results in a storage means;
- at least one instruction in the said set of instructions for directing the said processing means to generate a set containing a plurality of said sequence of results obtaining by varying the sets of determined parameters for the said strategy for the said set of time series for the said time frame for the said discrete time interval for the said portfolio of investments in the said environment and store the set containing a plurality of sequence of results in a storage means;
- at least one instruction in the said set of instructions for directing the said processing means to apply the said genetic algorithm model to the created and stored set containing the plurality of said sequences of results for creating at least one intermediate generation of partly or fully optimized returns on the said portfolio of investments and generating at least one set of determined parameters;
- a multiple closed loop feedback means associated with the processing means cooperating with said storage means for obtaining partly optimized intermediate values of multi-objective function; and
- at least one setting means for setting of convergence criteria to define an end point for the multiple closed loop feedback means; and
- a comparator means for comparing the partly optimized intermediate values of the multi-objective function with the set of convergence criteria to obtain an optimized value of the multi-objective function with the set of convergence criteria to obtain an optimized value of the multi-objective function;
- wherein the polarizing means includes a noise elimination means co-operating with the collating means which consists of filtering means for filtering spurious records, renaming means for organizing, adjustment means for adjusting time based volume and prices of the elements of extracted data, generating means for generating Open-High--Low-Close-Volume bars corresponding to the set of discrete time intervals to obtain polarized data; and wherein the transposing means is a processing means co-operating with a storage means having a stored set of transposing instructions for processing in accordance with the strategies.

18. The apparatus of claim 17, in which the storage means comprises a plurality of linked or remotely located elements co-operating with each other.

19. The apparatus of claim 17, in which the database is a database linked to at least one exchange selected from a set of exchanges comprising stock exchanges, derivatives exchanges, fixed income exchanges, and monetary exchanges, the database being static and dynamic.

20. The apparatus of claim 17, in which, the collating means comprises inputting means for receiving raw data from at least one data source, pre-filtering means for extracting the raw data into an intermediately pre-filtered data and linking means for linking elements of the extracted data for the purposes of collation.

21. The apparatus of claim 17, in which the multiple closed loop feedback means is a processing means having a stored set of multiple closed loop feedback instructions for obtaining partly optimized intermediate values of the multi-objective function.

22. The apparatus of claim 17, in which the comparator means is a processing means having a stored set of convergence instructions for comparing the intermediate values of the multi-objective function with the set convergence criteria.

* * * * *